US012354094B2

(12) United States Patent
Jones et al.

(10) Patent No.: US 12,354,094 B2
(45) Date of Patent: Jul. 8, 2025

(54) REAL-TIME PROVISIONING OF DIRECTED DIGITAL CONTENT BASED ON DECOMPOSED STRUCTURED MESSAGING DATA

(71) Applicant: The Toronto-Dominion Bank, Toronto (CA)

(72) Inventors: Christopher Mark Jones, Villanova, PA (US); Barry Wayne Baird, Jr., Kennett Square, PA (US); Claude Bernell Lawrence, Jr., Philadelphia, PA (US); Jonathan Joseph Prendergast, West Chester, PA (US)

(73) Assignee: The Toronto-Dominion Bank, Toronto (CA)

( * ) Notice: Subject to any disclaimer, the term of this patent is extended or adjusted under 35 U.S.C. 154(b) by 274 days.

(21) Appl. No.: 17/827,175

(22) Filed: May 27, 2022

(65) Prior Publication Data

US 2022/0383314 A1   Dec. 1, 2022

Related U.S. Application Data

(60) Provisional application No. 63/194,747, filed on May 28, 2021.

(51) Int. Cl.
*G06Q 40/00*   (2023.01)
*G06F 16/9537*   (2019.01)
(Continued)

(52) U.S. Cl.
CPC ....... *G06Q 20/401* (2013.01); *G06F 16/9537* (2019.01); *G06F 16/955* (2019.01); *G06Q 20/389* (2013.01)

(58) Field of Classification Search
CPC ...... G06Q 40/00; G06Q 20/40; G06Q 20/389; G06F 16/955; G06F 16/9537
See application file for complete search history.

(56) References Cited

U.S. PATENT DOCUMENTS

| 7,676,425 | B1 | 3/2010 | Noles |
| 7,676,431 | B2 | 3/2010 | O'Leary et al. |

(Continued)

FOREIGN PATENT DOCUMENTS

| CN | 106204017 A | * 12/2016 |
| WO | 2001050370 A2 | 7/2001 |
| WO | 2002069290 A3 | 9/2002 |

OTHER PUBLICATIONS

Towards a two-tier hierarchical infrastructure: an offline payment system for central bank digital currencies M Christodorescu, WC Gu, R Kumaresan . . . —arXiv preprint arXiv . . . , 2020—arxiv.org (Year: 2020).*

*Primary Examiner* — Lalita M Hamilton
(74) *Attorney, Agent, or Firm* — NIXON PEABODY LLP

(57) ABSTRACT

The disclosed embodiments include computer-implemented systems and processes that generate and provision, in real time, directed digital content based on decomposed structured messaging data. For example, an apparatus may receive a plurality of messages that characterize first data exchanges initiated between a first counterparty and second counterparties during a first temporal interval. Each of the messages includes elements of message data associated with a real-time payment requested from the first counterparty by a corresponding one of the second counterparties. Based on the elements of message data, that apparatus may predict an occurrence of a second exchange of data that involves the first counterparty during a second temporal interval, and may transmit notification data that includes product data characterizing an available product associated with the pre- (Continued)

dicted occurrence of the second data exchange to a device operable by the first counterparty for presentation within a digital interface.

16 Claims, 9 Drawing Sheets

(51) Int. Cl.
*G06F 16/955* (2019.01)
*G06Q 20/38* (2012.01)
*G06Q 20/40* (2012.01)

(56) References Cited

U.S. PATENT DOCUMENTS

| | | |
|---|---|---|
| 7,707,107 B2 | 4/2010 | Gebb et al. |
| 7,873,543 B2 | 1/2011 | Perrier et al. |
| 10,185,936 B2 | 1/2019 | Praisner et al. |
| 10,387,881 B2 | 8/2019 | Studnitzer |
| 10,529,016 B2 | 1/2020 | Abela et al. |
| 10,789,641 B2 | 9/2020 | Lesandro et al. |
| 2002/0111915 A1 | 8/2002 | Clemens et al. |
| 2014/0025467 A1 | 1/2014 | Nagarahan et al. |
| 2015/0170175 A1 | 6/2015 | Zhang et al. |
| 2015/0220999 A1 | 8/2015 | Thornton et al. |
| 2019/0172045 A1* | 6/2019 | Dunjic ............... G06Q 20/3224 |
| 2019/0251544 A1* | 8/2019 | D'Agostino ....... G06Q 20/3224 |
| 2020/0051117 A1 | 2/2020 | Mitchell |
| 2020/0112526 A1* | 4/2020 | Moon ................... G06N 3/006 |
| 2020/0160295 A1 | 5/2020 | Jagalpure et al. |

* cited by examiner

| | | |
|---|---|---|
| Requested Execution Date | 2022-05-30 | — 228 |
| | | |
| Debtor | | |
|   Name | John Q. Stone | |
|   Postal Address | | |
|     Street Name | Eye Street NW | |
|     Building Number | 2220 | 232 |
|     Postal Code | 20037 | |
|     Town Name | Washington, D.C. | |
|     Country | US | |
| | | |
| Debtor Account | | |
|   Identification | XXXX-1234-5678-9012 | — 234 |
| | | |
| Amount | | |
|   Instructed Amount | 50.00 | 230 |
|   Currency | USD | |
| | | |
| Creditor | | |
|   Name | Sam's Haberdashery | |
|   Postal Address | | |
|     Street Name | M St N.W | |
|     Building Number | 3262 | 236 |
|     Postal Code | 20007 | |
|     Town Name | Washington, D.C. | |
|     Country | US | |
| | | |
| Creditor Account | | |
|   Identification | XXXX-9012-3456-7890 | — 238 |
| | | |
| Remittance Information | | |
|   Unstructured | http://www.example.com/receipt?custid='1234'?zip=20007' | — 244 |

REAL-TIME PROVISIONING OF DIRECTED DIGITAL CONTENT BASED ON DECOMPOSED STRUCTURED MESSAGING DATA

CROSS-REFERENCE TO RELATED APPLICATION

This application claims the benefit of priority to U.S. Provisional Patent Application No. 63/194,747, filed on May 28, 2021, the entire disclosure of which is expressly incorporated herein by reference to its entirety.

TECHNICAL FIELD

The disclosed embodiments generally relate to computer-implemented systems and processes that generate and provision, in real time, directed digital content based on decomposed structured messaging data.

BACKGROUND

The mass adoption of smart phones and digital payments within the global marketplace drives an increasingly rapid adoption of real-time payment (RTP) technologies by financial institutions, consumers, vendors and merchants, and other participants in the payment ecosystem. RTP technologies often emphasize data, messaging, and global interoperability and in contrast to many payment rails, such as those that support credit card payments, embrace the near ubiquity of mobile technologies in daily life to provide, to the participants in the RTP ecosystem, real-time service and access to funds.

SUMMARY

In some examples, an apparatus includes a communications interface, a memory storing instructions, and at least one processor coupled to the communications interface and to the memory. The at least one processor is configured to execute the instructions to receive a plurality of messages via the communications interface. Each of the messages is associated with a real-time payment requested from a first counterparty by a corresponding second counterparty. Each of the messages includes elements of message data that are disposed within corresponding message fields, and that characterize a first exchange of data initiated between the first counterparty and the corresponding second counterparty during a first temporal interval. The at least one processor is configured to execute the instructions to, based on the elements of message data, perform operations that predict an occurrence of a second exchange of data that involves the first counterparty during a second temporal interval. The second temporal interval is disposed subsequent to the first temporal interval. The at least one processor is configured to execute the instructions to generate product data characterizing a product that is available to the first counterparty and associated with the predicted occurrence of the second data exchange, and transmit, via the communications interface, notification data that includes the product data to a device operable by the first counterparty. The notification data causes an application program executed at the device to present a portion of the product data within a digital interface.

In other examples, a computer-implemented method includes receiving a plurality of messages using at least one processor. Each of the messages is associated with a real-time payment requested from a first counterparty by a corresponding second counterparty. Each of the messages includes elements of message data that are disposed within corresponding message fields, and that characterize a first exchange of data initiated between the first counterparty and the corresponding second counterparty during a first temporal interval. The computer-implemented method includes, based on the elements of message data, performing operations, using the at least one processor, that predict an occurrence of a second exchange of data that involves the first counterparty during a second temporal interval. The second temporal interval is disposed subsequent to the first temporal interval. The computer-implemented method includes generating, using the at least one processor, product data characterizing a product that is available to the first counterparty and associated with the predicted occurrence of the second data exchange, and transmitting, using the at least one processor, notification data that includes the product data to a device operable by the first counterparty. The notification data causes an application program executed at the device to present a portion of the product data within a digital interface.

Further, in some examples, a tangible, non-transitory computer-readable medium stores instructions that, when executed by at least one processor, cause the at least one processor to perform a method that includes receiving a plurality of messages. Each of the messages is associated with a real-time payment requested from a first counterparty by a corresponding second counterparty. Each of the messages includes elements of message data that are disposed within corresponding message fields, and that characterize a first exchange of data initiated between the first counterparty and the corresponding second counterparty during a first temporal interval. The method includes, based on the elements of message data, performing operations that predict an occurrence of a second exchange of data that involves the first counterparty during a second temporal interval. The second temporal interval is disposed subsequent to the first temporal interval. The method includes generating product data characterizing a product that is available to the first counterparty and associated with the predicted occurrence of the second data exchange, and transmitting notification data that includes the product data to a device operable by the first counterparty. The notification data causes an application program executed at the device to present a portion of the product data within a digital interface.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 2B illustrates portions of an exemplary request for payment (RFP) message, in accordance with some exemplary embodiments.

Like reference numbers and designations in the various drawings indicate like elements.

DETAILED DESCRIPTION

Figure 1:
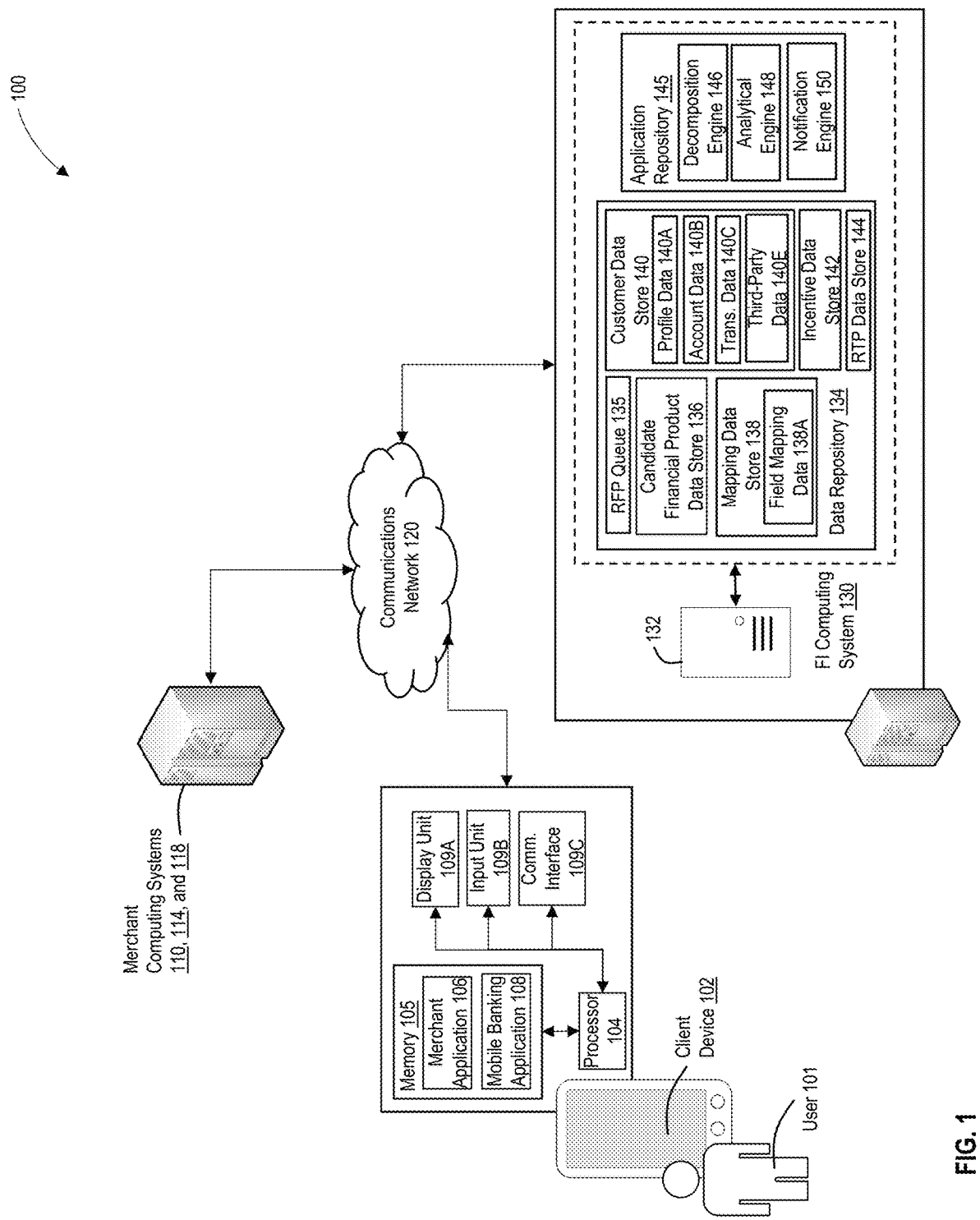
FIG. 1 is a block diagram of an exemplary computing environment, in accordance with some exemplary embodiments.

Today, the mass adoption of smart phones and digital payments within the global marketplace drives an adoption of real-time payment (RTP) technologies by financial institutions, consumers, vendors and merchants, and other participants in the payment ecosystem. These RTP technologies often emphasize data, messaging, and global interoperability and in contrast to conventional payment rails, may embrace the near ubiquity of mobile technologies in daily life to provide, to the participants in the RTP ecosystem, real-time service and access to funds. To facilitate the strong emphasis on data, messaging, and global interoperability between financial institutions, many RTP technologies adopt, and exchange data formatted in accordance with, one or more standardized data-exchange protocols, such as the ISO 20022 standard for electronic data exchange between financial institutions.

For example, a customer of a financial institution may initiate a plurality of transactions to purchase one or more products or services from corresponding merchants or retailers, either through in-person interaction at a physical location of the merchant or retailer, or through digital interactions with a computing system of the merchant (e.g., via a web page or other digital portal). In some instances, and to fund the initiated purchase transaction, the customer may provide each of the merchants with data characterizing a payment instrument, such as credit card account issued by the financial institution (e.g., via input provisioned to the web page or digital portal, or based on an interrogation of a physical payment card by point-of-sale terminal, etc.). The merchant computing systems may perform operations that generate elements of messaging data that identify and characterize the corresponding merchant and the corresponding initiated purchase transaction, and that include portions of the data characterizing the payment instrument, and that submit the generated elements of messaging data to a transaction processing network or payment rail in accordance with a predetermined schedule (e.g., in batch form with other elements of messaging data at a predetermined time on a daily basis). In some instances, one or more computing systems of the transaction processing network or payment rail may perform operations that execute, clear, and settle each of the initiated purchase transactions involving the corresponding payment instrument within a predetermined temporal interval subsequent to the initiation of the purchase transaction, such as, but not limited to, forty-eight hours.

In other examples, the merchants (or the financial institutions of the merchants) and the financial institution of the customer may represent participants in the RTP ecosystem, and the merchant computing systems (or a computing system associated with the financial institution of one or more of the merchants) may generate a corresponding message (e.g., a Request for Payment (RFP) message) that requests a real-time payment from the customer that funds the corresponding initiated purchase transaction, and may transmit that message to one or more computing systems of the financial institution of the customer (e.g., directly or through one or more intermediate systems associated with the RTP ecosystem, such as a clearinghouse system). Each of the generated and transmitted RFP message may, for example, be formatted in accordance with the ISO 20022 data-exchange format, and may include message fields populated with information that includes, but is not limited to, information identifying the customer and the corresponding merchant, information characterizing the corresponding requested payment (e.g., a requested payment amount, a requested payment date, an identifier of an account selected by the customer to fund the requested, real-time payment, or an identifier of an account of the merchant capable of receiving the requested, real-time payment, etc.), and information characterizing the corresponding initiated purchase transaction (e.g., a transaction date or time, or an identifier of one or more of the products or services involved in the initiated purchase transaction, such as a corresponding UPC, etc.). Further, the ISO-20022-compliant RFP message may also include a link within a structured or unstructured message field to information, such as remittance data, associated with the requested, real-time payment (e.g., a long- or shortened Uniform Resource Location (URL) pointing to a formatted invoice or statement that includes any of the information described herein).

In some examples, the elements of structured or unstructured data maintained within the message fields of exemplary, ISO-20022-compliant RFP messages described herein may extend beyond the often-limited content of the message data transmitted across many existing payment rails and transaction processing networks. Further, when intercepted and decomposed by a computing system of the financial institution of the customer, these elements of structured or unstructured RFP message data may be processed by the computing system of the financial institution to adaptively determine the terms and conditions of a financial product that is "pre-approved" for provisioning to the customer by the financial institution, and that is available and fund not only real-time payments associated with purchase transactions initiated by the customer at corresponding ones of the merchants (and requested by corresponding ones of the merchants) during a prior temporal interval, but also predicted occurrences of one or additional purchase transactions during a future temporal interval that are consistent with a intent or purpose of the purchase transactions initiated during the prior temporal interval. By way of example, and using any of the exemplary processes described herein, the computing system of the financial institution may provision, to a device operable by the customer, a product notification that identifies and characterizes the pre-approved financial product, such as a secured credit product or a loan product, and the terms and conditions associated with that available financial product, and an application program executed by the customer device may perform operations, described herein, that render the product notification for presentation with a portion of a digital interface.

Upon presentation within the digital interface of the customer device, the product notification may, among other things, identify the pre-approved financial product and the determined terms and conditions, and may prompt the customer to accept, or alternatively decline, the offer to fund the requested, real-time payments associated with the initiated purchase transaction (e.g., associated with corresponding ones of the received or intercepted RFP messages) using the available financial product in accordance with the determine terms and conditions. Further, and based on confirmation data indicative of the customer acceptance of the offered financial product, the computing system of the financial institution may perform any of the exemplary processes described herein to issue the now-accepted financial product to the customer, and to generate additional, ISO-2002-compliant RTP messages that, when provisioned to one or more computing systems of the merchants associated with the initiated purchase transactions and the received or intercepted RFP messages (or to an intermediate computing system, such as a computing system of the merchants' financial institutions), provides the corresponding requested payment using funds drawn from the issued financial product in real-time and contemporaneously with the initiation of the purchase transactions and the real-time payments requested by corresponding ones of the merchants.

Certain of the exemplary processes described herein, which decompose the structured message fields of a plurality of ISO-20022-compliant RFP messages received during a prior temporal interval to obtain corresponding elements of decomposed message data characterizing the customer, the merchant, and the initiated purchase transaction, and the requested, real-time payment, which analyze the elements of decompose message data to determine terms and conditions of a financial product appropriate to, and available to fund not each of the purchase transactions initiated during the prior temporal interval, but also predicted occurrences of one or more additional purchase transactions during a future temporal interval, which provision data characterizing the available financial product to the customer device for presentation within a digital interface in real-time and contemporaneously with the initiated purchase transactions and prior to an initiation of additional, future purchase transactions, may be implemented in addition to, or as an alternate to, many processes that rely on the often-limited content of temporally delayed message data transmitted across many existing payment rails and transaction processing networks.

A. Exemplary Computing Environments

FIG. 1 is a diagram illustrating an exemplary computing environment 100 that includes, among other things, one or more computing devices, such as a client device 102, and one or more computing systems, such one or more merchant computing systems (including merchant systems 110, 114, and 118), and a financial institution (FI) system 130, each of which may be operatively connected to, and interconnected across, one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

Client device 102 may include a computing device having one or more tangible, non-transitory memories, such as memory 105, that store data and/or software instructions, and one or more processors, e.g., processor 104, configured to execute the software instructions. The one or more tangible, non-transitory memories may, in some aspects, store software applications, application modules, and other elements of code executable by the one or more processors, such as, but not limited to, an executable web browser (e.g., Google Chrome™, Apple Safari™, etc.), an executable application associated with one of merchant systems 110, 114, or 118 (e.g., merchant application 106), and additionally or alternatively, an executable application associated with FI computing system 130 (e.g., mobile banking application 108).

In some instances, not illustrated in FIG. 1, memory 105 may also include one or more structured or unstructured data repositories or databases, and client device 102 may maintain one or more elements of device data and location data within the one or more structured or unstructured data repositories or databases. For example, the elements of device data may uniquely identify client device 102 within computing environment 100, and may include, but are not limited to, an Internet Protocol (IP) address assigned to client device 102 or a media access control (MAC) layer assigned to client device 102.

Client device 102 may also include a display unit 109A configured to present interface elements to a corresponding user, such as a user 101, and an input unit 109B configured to receive input from user 101, e.g., in response to the interface elements presented through display unit 109A. By way of example, display unit 109A may include, but is not limited to, an LCD display unit or other appropriate type of display unit, and input unit 109B may include, but is not limited to, a keypad, keyboard, touchscreen, voice activated control technologies, or appropriate type of input unit. Further, in additional aspects (not illustrated in FIG. 1), the functionalities of display unit 109A and input unit 109B may be combined into a single device, e.g., a pressure-sensitive touchscreen display unit that presents interface elements and receives input from user 101. Client device 102 may also include a communications interface 109C, such as a wireless transceiver device, coupled to processor 104 and configured by processor 104 to establish and maintain communications with communications network 120 via one or more communication protocols, such as WiFi®, Bluetooth®, NFC, a cellular communications protocol (e.g., LTE®, CDMA®, GSM®, etc.), or any other suitable communications protocol.

Examples of client device 102 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface device or unit, such as display unit 109A. In some instances, client device 102 may also establish communications with one or more additional computing systems or devices operating within environment 100 across a wired or wireless communications channel, e.g., via the communications interface 109C using any appropriate communications protocol. Further, user 101 may operate client device 102 and may do so to cause client device 102 to perform one or more exemplary processes described herein.

Each of the one or more merchant computing systems, including merchant system 110, merchant system 114, and merchant system 118, and FI computing system 130 may represent a computing system that includes one or more servers and one or more tangible, non-transitory memory devices storing executable code, application engines, or application modules. Each of the one or more servers may include one or more processors, which may be configured to execute portions of the stored code, application engines, or application modules to perform operations consistent with the disclosed exemplary embodiments. For example, as illustrated in FIG. 1, the one or more servers of FI computing system 130 may include server 132 having one or more processors configured to execute portions of the stored code, application engines, or application modules maintained within the one or more corresponding, tangible, non-transitory memories. In some instances, each of the merchant computing systems, including merchant systems 110, 114, and 118, and/or FI computing system 130 may correspond to a discrete computing system, although in other instances, one or more of merchant systems 110, 114, and 118, or FI computing system 130, may correspond to a distributed computing system having multiple, computing components distributed across an appropriate computing network, such as communications network 120 of FIG. 1, or those established and maintained by one or more cloud-based providers, such as Microsoft Azure™, Amazon Web Services™, or another third-party, cloud-services provider. Further, each of the merchant computing systems, including merchant systems 110, 114, and 118, and FI computing system 130 may also include one or more communications units, devices, or interfaces, such as one or more wireless transceivers, coupled to the one or more processors for accommodating wired or wireless internet communication across network 120 with other computing systems and devices operating within environment 100 (not illustrated in FIG. 1).

By way of example, each of merchant systems 110, 114, and 118 may be associated with, or operated by, a corresponding merchant that offers products or services for sale to one or more customers, such as, but not limited to, user 101 that operates client device 102. In some instances, described herein, merchant system 110 may be associated with, or operated by, a first retailer (e.g., "Sam's Haberdashery"), merchant system 114 may be associated with, or operated by, a second retailer (e.g., "Woody's Suits"), and merchant system 118 may be associated with, or operated by, a third retailer (e.g., "Claude's Clothes"). Further, one or more of merchant systems 110, 114, and 118 may exchange data programmatically with one or more application programs executed at client device 102, such as merchant application 106, and based on the programmatically exchanged data, client device 102 may perform any of the exemplary processes described herein to initiate a transaction to purchase one or more of the products or services offered for sale by merchant 111.

Further, and as described herein, FI computing system 130 may be associated with, or operated by, a financial institution that offers financial products or services to one or more customers, such as, but not limited to, user 101. The financial products or services may, for example, include a financial product issued to user 101 by the financial institution and available to fund the initiated purchase transaction, and examples of the payment instrument may include, but are not limited to, a credit card account issued by the financial institution, a secured or unsecured credit product issued by the financial institution (e.g., an unsecured or secured line-of-credit, an unsecured personal loan, etc.), or a checking, savings, or other deposit account issued by and maintained at the financial institution.

In some instances, FI computing system 130 may perform any of the exemplary processes described herein to obtain, receive, or intercept a plurality of request-for-payment (RFP) message associated with purchase transactions initiated by a first counterparty (e.g., user 101 of FIG. 1) and involving corresponding second counterparties (e.g., one of a first retailer, a second retailer, or a third retailer associated with merchant systems 110, 114, or 118 of FIG. 1). As described herein, the received RFP message may be formatted and structured in accordance with one or more standardized data-exchange protocols, such as the ISO 20022 standard for electronic data exchange between financial institutions. Further, and based on elements of mapping data that characterize a structure, composition, or format of one or more data fields of the ISO-20022-compliant RFP message, FI computing system 130 may perform any of the exemplary processes described herein to decompose each of the received RFP message and obtain data characterizing user 101, a corresponding one of the merchants (e.g., the first retailer, the second retailer, or the third retailer, as described herein), and additionally, or alternatively, the initiated purchase transaction.

For example, the obtained data (e.g., "decomposed field" data) may include one or more of: (i) customer data identifying user 101, such as a unique customer identifier (e.g., a customer name, an alphanumeric login credential, etc.) and a postal address; (ii) payment data characterizing the real-time payment transaction, such as a transaction amount, a requested transaction date or time, an identifier of a product or service involved in the transaction, and an identifier of a customer account (e.g., from which the transaction amount will be debited) and a merchant account (e.g., to which the transaction amount will be credited); (iii) counterparty data identifying the corresponding merchant, such as a counterparty name (e.g., a merchant name, etc.) and postal address; and (iv) transaction data that identifies a value of one or more parameters of corresponding ones of the initiated purchase transactions (e.g., a transaction amount, a transaction date or time, an identifier of one or more of the products or services involved in corresponding ones of the initiated purchase transactions).

FI computing system 130 may also perform any of the exemplary processes described herein to analyze the elements of decomposed elements of customer, counterparty, transaction, or payment data obtained from the message fields of each of the RFP messages, which characterize purchase transactions initiated by a counterparty (e.g., user 101) during a corresponding, prior temporal interval (e.g., the decomposed elements of customer, counterparty, merchant, transaction, or payment data described herein). Based on the analysis of the decomposed elements of customer, counterparty, merchant, transaction, or payment, FI computing system 130 may perform any of the exemplary processes described herein to determine a likelihood that user 101 will initiate one or more additional purchase transactions during a future temporal interval, and further, to predict a value of one or more parameters that characterize these additional purchase transactions during the future temporal interval, such as, but not limited to a transaction amount, a corresponding counterparty (e.g., a corresponding merchant), and an identifier of one or more products or services involved in corresponding ones of the additional purchase transactions during the future temporal interval.

FI computing system 130 may also perform any of the exemplary processes described processes described herein to establish that a credit or loan product, such as an unsecured installment loan or an unsecured personal loan, is available for provisioning to user 101 and available to fund both the purchase transactions initiated during the prior temporal interval and the predicted occurrences of the additional purchase transactions during the future temporal interval. In some instances, based on an application of one or more internal qualification or underwriting criteria to data characterizing user 101, and interactions between user 101 and the financial institution or one or more unrelated financial institution, and a use, or misuse, of financial product provisioned by the financial institution of the unrelated financial institutions, FI computing system 130 may perform any of the exemplary processes described herein to "preapprove" user 101 for the credit or loan product in an amount sufficient to fund both the initiated purchase transactions and the predicted occurrences of the future purchase transactions (and in some instances, season variations in purchasing or spending habits of the user 101). Further, FI computing system 130 may perform operations that generate a product notification characterizing the pre-approved credit or loan product and one or more determined terms and conditions, and provision the product notification to a device operable by user 101, such as client device 102, in real-time and contemporaneously with an interception of receipt of each of plurality of RFP messages and in some instances, prior to an execution of a requested, real-time payment associated with at least one of the RFP messages, e.g., while user 101 continues to shop for products or services and continues to initiate purchase transactions.

To facilitate a performance of one or more of these exemplary processes, FI computing system 130 may maintain, within the one or more tangible, non-transitory memories, a data repository 134 that includes, but is not limited to, a request-for-payment (RFP) queue 135, a candidate financial product data store 136, a mapping data store 138, a customer data store 140, an incentive data store 142, and a real-time payment (RTP) data store 144. RFP queue 135 may include one or more discrete RFP messages received by FI computing system 130 using any of the exemplary processes described herein. In some instances, the RFP messages maintained within RFP queue 135 may be prioritized in accordance with a time or date of receipt by FI computing system 130 or with requested payment data associated with each of the RFP messages, and each of the prioritized RFP messages may be associated with a corresponding temporal pendency. Further, FI computing system 130 may perform any of the exemplary processes described herein to provision elements of notification data associated with each of the RFP messages to a computing system or device associated with a corresponding customer (e.g., client device 102 associated with user 101), and FI computing system 130 may perform operations that maintain each of the RFP messages within RFP queue 135 until a receipt, at FI computing system 130, of confirmation data from corresponding ones of the computing systems or devices indicating an approval, or a rejection, of the corresponding requested payment, or until an expiration of the corresponding pendency period.

Candidate financial product data store 136 may include structured or unstructured data that characterizes one or more candidate financial products, such as, but not limited to, one or more the exemplary, secured credit or loan products described herein, that a customer, such as user 101, may select to fund one or more of the requested, real-time payments associated with corresponding ones of the intercepted or received RFP message. In some instances, the elements of candidate financial product data store 136 may include, for each of the candidate financial products, a unique product identifier (e.g., a product name, etc.), data characterize terms and conditions for each candidate financial product, and further, data characterizing internal qualification or underwriting procedures for each candidate financial product, as described herein.

Mapping data store 138 may include structured or unstructured data records that maintain one or more elements of field mapping data 138A. For example, and as described herein, FI computing system 130 may receive, obtain, or intercept one or more RFP messages, each of which may be formatted and structured in accordance with a corresponding, standardized data-exchange protocol, such as the ISO 20022 standard for electronic data exchange between financial institutions. In some instances, the one or more elements of field mapping data 138A may characterize a structure, composition, or format of the message data populating one or more data fields of the ISO-20022-compliant RFP message, or a corresponding RFP message compliant with an additional, or alternate, standardized data-exchange protocol.

In some instances, customer data store 140 may include structured or unstructured data records that maintain information identifying and characterizing one or more customers of the financial institution, and further, interactions between these customers and not only the financial institution, but also other unrelated third parties, such as the merchants or retailers described herein. For example, as illustrated in FIG. 1, customer data store 140 may include one or more elements of customer profile data 140A, which identify and characterize corresponding ones of the customers of the financial institution, one or more elements of account data 140B, which may identify and characterize one or more accounts held by the customers, one or more elements of transaction data 140C, which identify and characterize prior purchase or payment transactions involving the customers of the financial institution (such as, but not limited to, user 101), and one or more elements of third-party data 140D associated with corresponding customers of the financial institution.

By way of example, for a corresponding one of the customer, such as user 101, the elements of customer profile data 140A may include, but are not limited to, a customer identifier of user 101 (e.g., an alphanumeric login credential, a customer name, etc.), a postal address of user 101, and values of one or more demographic parameters characterizing user 101 (e.g., a customer age, customer profession, etc.). The accounts held by the customers of the financial institution may include, but are not limited to, a deposit account (e.g., a checking or a savings account issued by the financial institution), a credit-card account, or an account associated with an additional, or alternate, financial product, such as an unsecured personal loan or an installment loan, and the elements of account data 140B may include, for an account held by a corresponding one of the customers, such as user 101, the customer identifier of user 101, all or a portion of an account number (e.g., an actual account number, a tokenized account number, etc.), and data characterizing a status of the account (e.g., a current balance, an overdue balance, length of account existence, etc.) and interactions between user 101 and the account (e.g., amounts and dates of withdrawals, etc.). Further, the elements of transaction data 140C may include the customer identifier of user 101, data identifying one or more prior purchase or payment transactions initiated by user 101 (e.g., a unique, alphanumeric transaction identifier assigned by FI computing system 130), and may include values of transaction parameters that characterize each of the prior purchase or payment transactions, such as a transaction data or time, a transaction amount, an identifier of a corresponding counterparty, or an identifier of an account (e.g., an account number, etc.) that funds, or receives proceeds from, the prior purchase or payment transaction.

The elements of third-party data 140D may, for a corresponding one of the customers, such as user 101, include the customer identifier of user 101 and one or more elements of governmental, judicial, regulatory, or reporting data associated with, and characterizing user 101. By way of example, the elements of third-party data 140D associated with user 101 may include one or more elements of data generated and maintained by a governmental entity (e.g., governmental data) that identifies parcels of real estate, vehicles, or other tangible properties held or owned by user 101. Additionally, or alternatively, the elements of third-party data 140D associated with user 101 may include one or more elements of data generated and maintained by a reporting entity, such as credit-bureau data that includes a credit score or data characterizing one or more credit inquiries associated with user 101 during corresponding temporal intervals. In some examples, FI computing system 130 perform operations that receive, via a secure programmatic channel of communications, one or more of the customer-specific elements of third-party data 140D maintained within customer data store 140 from one or more computing systems associated with corresponding governmental, judicial, regulatory, or reporting entities in accordance with a predetermined temporal schedule, on a continuous, streaming basis, or in response to a requested generated and transmitted by FI computing system 130.

Incentive data store 142 may include structured or unstructured data records that include elements of digital content that, when presented to user 101 by client device 102 within a corresponding digital interface, identify and provide an offer or incentive for user 101 to accept a pre-approved financial product, or to apply for a financial product, such as the exemplary financial products characterized by the data records of candidate financial product data store 136. In some instances, the structured or unstructured data records of incentive data store 142 may store each of the elements of digital content in conjunction with one or more elements of metadata that, among other things, identify a corresponding financial product (e.g., a product name, an alphanumeric product identifier assigned by the financial institution, etc.). Further, in some instances, the structured or unstructured data records of incentive data store 142 may store each of the elements of digital content in conjunction with one or more elements of layout data, which specify a disposition of the elements of digital content, or visual characteristics of the elements of digital content, when rendered for presentation within a corresponding digital interface by one or more application programs executed by client device 102.

RTP data store 144 may include one or more elements of decomposed field data generated through a decomposition of corresponding ones of the received RFP messages, e.g., based on the elements of field mapping data 138A and through an implementation of any of the exemplary processes described herein. In some instances, the elements of decomposed field data maintained within RTP data store 144 may establish a time-evolving record of real-time payment transactions initiated by, or involving, the user 101 and other customers of the financial institution during a current temporal interval and across one or more prior temporal intervals, and across various merchant classifications or geographic regions.

Further, and to facilitate the performance of any of the exemplary processes described herein, FI computing system 130 may also maintain, within the one or more tangible, non-transitory memories, an application repository 145 that maintains, but is not limited to, a decomposition engine 146, an analytical engine 148, and a notification engine 150, each of which may be executed by the one or more processors of server 132.

For example, and upon execution by the one or more processors of FI computing system 130, executed decomposition engine 146 may perform any of the exemplary processes described herein to obtain field mapping data 138A from mapping data store 138, to apply field mapping data 138A to a received, obtained, or intercepted RFP message, and based on the application of field mapping data 138A to the RFP message, to decompose the RFP message and obtain elements of message data that not only identify and characterize each counterparty involved in an initiated purchase transaction (e.g., user 101 and a corresponding merchant, as described herein), but that also characterize the initiated purchase transaction.

Further, and upon execution by the one or more processors of FI computing system 130, executed analytical engine 148 may perform any of the exemplary processes described herein to analyze the elements of message data obtained from the message fields of each of the RFP messages, which characterize purchase transactions initiated by a counterparty (e.g., user 101) during a corresponding, prior temporal interval (e.g., the decomposed elements of customer, counterparty, merchant, transaction, or payment data described herein). Based on the analysis of the elements of message data, executed analytical engine 148 may perform any of the exemplary processes described herein to determine a likelihood that user 101 will initiate one or more additional purchase transactions during a future temporal interval, and further, to predict a value of one or more parameters that characterize these additional purchase transactions during the future temporal interval, such as, but not limited to a transaction amount, a corresponding counterparty (e.g., a corresponding merchant), and an identifier of one or more products or services involved in corresponding ones of the additional purchase transactions during the future temporal interval. In some instances, the predicted occurrences of the additional purchase transactions during the future temporal interval may be consistent with a determined intent or customer purpose that characterizes the purchase transactions initiated by user 101 during a corresponding, prior temporal interval.

Executed analytical engine 148 may also perform any of the exemplary processes described processes described herein to establish that a credit or loan product, such as an unsecured installment loan or an unsecured personal loan, is available for provisioning to user 101 and available to fund both the purchase transactions initiated during the prior temporal interval and the predicted occurrences of the additional purchase transactions during the future temporal interval. In some instances, based on an application of one or more internal qualification or underwriting criteria to data characterizing user 101, and interactions between user 101 and the financial institution or one or more unrelated financial institution, and a use, or misuse, of financial product provisioned by the financial institution of the unrelated financial institutions, executed analytical engine 148 may perform any of the exemplary processes described herein to "pre-approve" user 101 for the credit or loan product in an amount sufficient to fund both the initiated purchase transactions and the predicted occurrences of the future purchase transactions (and in some instances, season variations in purchasing or spending habits of the user 101).

Upon execution by the one or more processors of FI computing system 130, notification engine 150 may perform any of the exemplary processes described herein to generate one or more elements of notification data that include one or more of the information identifying the available and pre-approved credit or loan product, the corresponding loan amount, and one or more determined terms and conditions. In some instances, when provisioned to client device 102 by FI computing system 130, the elements of notification data may cause one or more application programs executed by client device 102 (e.g., mobile banking application 108) to present interface elements within a corresponding digital interface that, among other things, offer the available and pre-approved credit or loan product to user 101, and that prompt user 101 to accept the offered credit or loan product in accordance with the determined terms and conditions. As described herein, when provisioned to user 101, the accepted credit or loan product may fund not only the initiated purchase transactions associated with the received or intercepted RFP messages (e.g., contemporaneously with the initiation of the purchase transactions and the reception or interception of the RFP messages), but also the predicted occurrences of one or more of the additional purchase transactions during the future temporal interval.

Figure 2A:
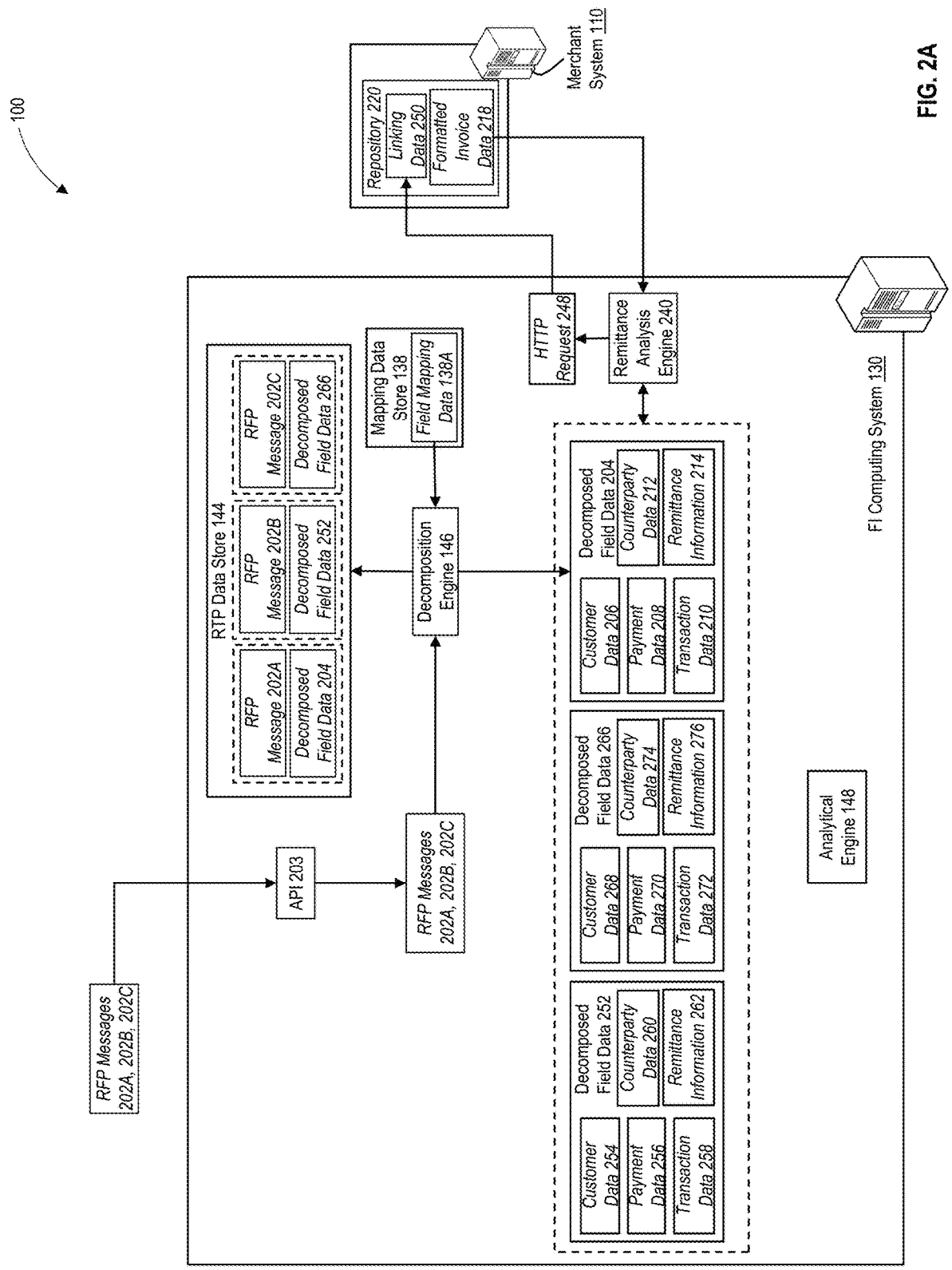
FIG. 2A is a block diagram illustrating a portion of an exemplary computing environment, in accordance with some exemplary embodiments.

B. Real-Time Generation and Provisioning of
Directed Digital Content Based on Decomposed
Structured Messaging Data Referring to FIG. 2A, a computing system associated with the financial institution, such as the FI computing system 130, may receive or intercept a plurality of RFP messages identifying and characterizing real-time payments requested customers of the financial institution, such as, but not limited to, RFP messages 202A, 202B, and 202C. In some instances, each of RFP message 202A, 202B, and 202C may identify and characterize a real-time payment requested from a customer of the financial institution, such as user 101, by a corresponding merchant for an initiated purchase transaction involving corresponding products or services, and FI computing system 130 may receive each of RFP message 202A, 202B, and 202C from a corresponding merchant computing system, such a corresponding one of merchant systems 110, 114, and 118 of FIG. 1, or from one or more intermediate computing system associated with the RTP ecosystem, such as, but not limited to, a computing system of a clearinghouse. As described herein, each of RFP messages 202A, 202B, and 202C may be structured in accordance with the ISO 20022 standard for electronic data exchange between financial institutions, and in some examples, each of RFP messages 202A, 202B, and 202C may correspond to a pain.013 message as specified within the ISO 20022 standard.

By way of example, user 101 may decide to transition to a new position at a current place of employment in Washington, D.C., and in anticipation of that new position, user 101 may elect to purchase several items of apparel from one or more local merchants. For instance, user 101 may initiate a first transaction at 10:30 a.m. on May 30, 2022, that purchases a shirt for $50.00 from a first merchant (such as "Sam's Haberdashery") located at 3262 M St N.W. in Washington, D.C., and may initiate a second transaction at 11:15 a.m. on May 30, 2022, that purchases $75.00 in pants from a second merchant (e.g., "Woody's Suits") located at 3320 Cady's Alley N.W. in Washington, D.C. Further, user 101 may also initiate at third transaction at 12:30 p.m. on May 30, 2022, that purchases a $175.00 jacket from a third retailer (e.g., "Claude's Clothing") located at 3077 M St N.W. in Washington, D.C. In some instances, rather than processing payment for each of the initiated first, second, and third purchase transactions using a conventional payment processing networks (e.g., a payment rail associated with a debit- or credit-card account issued by the financial institution), one or more computing systems operated by each of the first, second, and third retailers (e.g., a respective one of merchant systems 110, 114, and 118 of FIG. 1), or one more computing systems associated with a financial institution of each of the first, second, and third retailers, may generate a corresponding one of RFP messages 202A, 202B, and 202C that requests a real-time payment from user for the purchased products associated with respective ones of the first, second, and third purchase transactions (e.g., a respective one of the $50.00 purchase of the shirt, the $75.00 purchase of patents, and the $175.00 purchase of the jacket), and transmit the corresponding one of RFP messages 202A, 202B, and 202C across a communications network to FI computing system 130, either directly or through one or more intermediate computing systems, such as a clearinghouse.

A programmatic interface established and maintained by FI computing system 130, such as application programming interface (API) 208, may receive each of RFP messages 202A, 202B, and 202C, and may route RFP message 202A, 202B, and 202C to a decomposition engine 146 executed by the one or more processors of FI computing system 130. In some examples, FI computing system 130 may receive one or more of RFP messages 202A, 202B, and 202C directly across communications network 120 via a channel of communications established programmatically between API 203 and an executed RTP engine of a corresponding one of merchant systems 110, 114, and 118. Further, in some examples, one or more portions of RFP messages 202A, 202B, and/or 202C may be encrypted (e.g., using a public cryptographic key associated with FI computing system 130), and executed decomposition engine 146 may perform operations that access a corresponding decryption key maintaining within the one or more tangible, non-transitory memories of FI computing system 130 (e.g., a private cryptographic key associated with FI computing system 130), and that decrypt the encrypted portions of RFP message 202A, 202B, and/or 202C using the corresponding decryption key.

In some instances, executed decomposition engine 146 may store each of RFP messages 202A, 202B, and 202C (in decrypted form) within a corresponding portion of data repository 134, e.g., within RFP queue 135. Executed decomposition engine 146 may also perform operations that access mapping data store 138 (e.g., as maintained within data repository 134), and obtain one or more elements of field mapping data 138A that characterize a structure, composition, or format of one or more data fields of RFP message 202A, 202B, and 202C. For example, and as described herein, each of RFP message 202A, 202B, and 202C may include message fields consistent with the ISO 20022 standard for electronic data exchange between financial institutions, and each of the message fields may be populated with data structured and formatted in accordance with the ISO 20022 standard.

By way of example, user 101 may initiate the $50.00 purchase of the shirt from the first retailer (e.g., "Sam's Haberdashery") at 10:30 a.m. on May 30, 2022. In some instances, RFP message 202A may be associated with a request, from the first retailer on May 30, 2022, for the real-time payment of $50.00 from user 101 for the purchased shirt, and referring to FIG. 2B, RFP message 202A may include message field 228 populated with a formatted payment date of May 30, 2022 (e.g., "2022-05-30"), and message fields 230 populated with respective ones of a formatted payment amount (e.g., "50.00") and a formatted payment currency (e.g., "USD").

RFP message 202A may also maintain, within corresponding ones of message fields 232, a formatted name of user 101 (e.g., "John Q. Stone") and selected portions of a formatted postal address of user 101 (e.g., "2220 Eye Street NW, Washington, D.C., 20037, US"), and may maintain, within message field 234, a formatted identifier of a financial services account selected by user 101 to fund the $50.00 payment to user 101 (e.g., an account number "XXXX-1234-5678-9012" of a deposit account maintained by user 101 and the financial institution). Further, as illustrated in FIG. 2B, message fields 236 of RFP message 202A may be populated, respectively, with a formatted name of the first retailer (e.g., "Sam's Haberdashery") and selected portions of a formatted postal address of the local home-improvement store (e.g., "3262 M St N.W., Washington, D.C., 20007"). RFP message 202A may also maintain, within message field 238, a formatted identifier of a financial services account held by the local home-improvement store and capable of receiving proceeds from the requested $50.00 payment (e.g., an account number "XXXX-9012-3456-7890" of a business checking account held by the first retailer, etc.).

In some instances, RFP message 202A may also include one or more message fields that specify structured, or unstructured, remittance information associated with the requested, $50.00 real-time payment for the shirt purchased by user 101 from Sam's Haberdashery on May 30, 2022, such as, but not limited to, a link to invoice data in PDF or HTML format that identifies the actual postal address of Sam's Haberdashery, and that includes contextual information identifying and characterizing the purchased shirt (e.g., a unique product identifier of the purchased shirt, such as a stock keeping unit (SKU), a universal product code (UPC), a product name, etc.) or the $50.00 purchase (e.g., a subtotal of the transaction, any applied sales taxes, or any delivery fees, etc.). As described herein, the link may include a long-form or shortened URL associated with formatted invoice data that that points to a storage location of formatted invoice data within a data repository maintained by one or more computing systems with the first retailer, e.g., merchant system 110. For example, message field 244 of RFP message 202A may be populated with a long-form URL (e.g., www.example.com/receipt?custid='1234'?zip=20007) that points to the formatted invoice data maintained within the data repository of merchant system 110, and that includes the actual postal code of the first retailer (e.g., "20007") and a customer identifier of user 101 assigned by the first retailer (e.g., "1234").

The disclosed embodiments are, however, not limited to RFP messages populated with these exemplary elements of customer, merchant, payment, transaction, and additional remittance information, and in other examples, RFP message 202A may include any additional, or alternate, message fields specified within field mapping data 138A and consistent with the ISO 20022 standard for electronic data exchange. Further, although not illustrated in FIG. 2B, RFP messages 202B and 202C may also include elements of customer, counterparty, payment, transaction, and additional remittance data, and other elements of data, specified within field mapping data 138A and consistent with the ISO 20022 standard for electronic data exchange. By way of example, the message fields of RFP message 202B may include elements of customer, merchant, payment, transaction, and additional remittance data that characterize a request, from the second retailer (e.g., "Woody's Suits") on May 30, 2022, for the real-time payment of $75.00 from user 101 for the purchase of the pants initiated at 11:15 a.m. on May 30, 2022, and the message fields of RFP message 202C may include elements of customer, counterparty, payment, transaction, and additional remittance data that characterize a request, from the third retailer (e.g., "Claude's Clothing") on May 30, 2022, for the real-time payment of $175.00 from user 101 for the purchase of the jacket initiated at 12:30 p.m. on May 30, 2022.

Referring back to FIG. 2A, and based on the obtained elements of field mapping data 138A, executed decomposition engine 146 may perform operations that parse RFP message 202A and obtain elements of decomposed field data 204 that identify and characterize the customer (e.g., user 101 of client device 102), the counterparty (e.g., the first retailer, "Sam's Haberdashery"), the requested, real-time payment, and the initiated purchase transaction. In some instances, and through the performance of these exemplary operations, executed decomposition engine 146 may "decompose" the structured or unstructured data populating the message fields of RFP message 202A in accordance with field mapping data 138A, and generate the elements of decomposed field data 204 that include, but are not limited to, one or more elements of customer data 206, payment data 208, transaction data 210, and counterparty data 212.

By way of example, and based on the elements of field mapping data 138A, executed decomposition engine 146 may determine that message fields 232 of RFP message 202A include data that identifies and characterizes user 101, and may perform operations that obtain the customer name of user 101 (e.g., "John Q. Stone") and the postal address associated with user 101 (e.g., "2220 Eye Street NW, Washington, D.C., 20037, US") from message fields 232 of RFP message 202A, and that package the obtained customer name and postal address into corresponding portions of customer data 206 of decomposed field data 204. Additionally, and based on the elements of field mapping data 138A, executed decomposition engine 146 may determine that message fields 236 of RFP message 202A includes data identifying and characterizing the first retailer, and may perform operations that obtain the name of the first retailer (e.g., "Sam's Haberdashery") and the postal address associated with the first retailer (e.g., "3262 M St N.W., Washington, D.C., 20007") from message fields 236, and that package the obtained name and postal address of the first retailer into corresponding portions of counterparty data 212 within decomposed field data 204.

In some instances, and based on the elements of field mapping data 138A, executed decomposition engine 146 may determine that one or more additional message fields of RFP message 202A include elements of data identifying and characterizing the requested payment, such as, but not limited to: message field 228, which includes the requested payment date (e.g., "May 30, 2022"); message fields 230, which includes data identifying the payment amount of the requested payment (e.g., $50.00) and the requested payment currency (e.g., "USD"); message field 234, which includes an identifier of the payment instrument selected by user 101 to fund the initiated purchase transaction (e.g., the account number "XXXX-1234-5678-9012"); and message field 238, which includes an identifier of an account associated with the first retailer and available of receiving the requested payment (e.g., the tokenized account number "XXXX-9012-3456-7890," etc.). Executed decomposition engine 146 may perform operations that extract the payment amount, the account identifiers, and the requested payment date from corresponding ones of message fields 228, 230, and 238, and that package the extracted payment amount, the identifiers of the selected payment instrument and the account associated with the first retailer, and the requested payment date into corresponding portions of payment data 208.

Further, and based on the elements of field mapping data 138A, executed decomposition engine 146 may also determine that one or more additional, or alternate, message fields of RFP message 202A (not illustrated in FIG. 2B) include elements of transaction data that characterize the initiates purchase transaction, e.g., the $50.00 purchase of the shirt at 10:30 a.m. on May 30, 2022, from Sam's Haberdashery in Washington, D.C. By way of example, the transaction data maintained within the additional, or alternate, message fields of RFP message 202A may include one or more identifiers of the purchased shirt (e.g., the product name, the corresponding UPC or SKU, etc.), the 10:30 a.m. transaction time, the May 30, 2022, transaction date, the total transaction amount of $50.00, a subtotal of $45.00 for the shirt, and $5.00 in imposed local sales tax. In some instances, executed decomposition engine 146 may perform operations that extract the elements of transaction data, such as, but not limited to, the exemplary elements described herein, from corresponding ones of the additional, or alternate, message fields, and package the extracted elements of transaction data into corresponding portions of transaction data 210 of decomposed field data 204.

Executed decomposition engine 146 may also determine, based on the elements of field mapping data 138A, that message field 244 of RFP message 202A includes structured or unstructured elements of remittance data that characterizes further the requested payment, the initiated transaction, user 101, or the first retailer, and executed decomposition engine 146 may obtain the structured or unstructured elements of remittance data from message field 244 of RFP message 202A and package the elements of remittance data into corresponding portions of remittance information 214. In some instances, the elements of structured or unstructured remittance data may include a link (e.g., a shortened or tiny URL, a long-form URL, etc.) to formatted invoice data associated with the requested payment and maintained by a corresponding computing system associated with the first retailer, such as merchant system 110. For example, the remittance data may include a long-form URL 216 (e.g., www.example.com/receipt?custid="1234"?zip=20007), that points to formatted invoice data 218 within the one or more tangible, non-transitory memories of merchant system 110, and that includes, among other things, the actual postal code of the first retailer (e.g., "20007") and a customer identifier of user 101 assigned by the first retailer (e.g., "1234").

In some instances, the one or more processors of FI computing system 130 may execute a remittance analysis engine 240, which may perform operations that, based on URL 216 maintained within remittance information 214 of decomposed field data 204, programmatically access elements of formatted invoice data 218 maintained within a data repository 220 at merchant system 110, and that process the accessed elements of formatted invoice data 218 to obtain additional, or alternate, elements of customer data 206, payment data 208, transaction data 210, counterparty data 212 that further characterize the initiated purchase transaction or the purchased products or services associated with the requested, real-time payment, e.g., the initiated $50.00 purchase of the shirt from the first retailer (e.g., "Sam's Haberdashery") on May 30, 2022, at 10:30 a.m. Examples of the additional elements of transaction data 210 may include, but are not limited to, one or more identifiers of the purchased shirt (e.g., the product name, the corresponding UPC or SKU, etc.), the 10:30 a.m. transaction time, the May 30, 2022, transaction date, the total transaction amount of $50.00, a subtotal of $45.00 for the hardwood flooring, or the $5.00 in imposed local sales tax.

For example, remittance analysis engine 240 may access URL 216 maintained within remittance information 214, and may process URL 216 and generate a corresponding HTTP request 248 for the elements of formatted invoice data 218 maintained at merchant system 110. Executed remittance analysis engine 240 may also perform operations that cause FI computing system 130 to transmit HTTP request 248 across network 120 to merchant system 110. Merchant system 110 may, for example, receive HTTP request 248, and based on portions of HTTP request 248 and linking data 250 maintained within data repository 220 (e.g., based on a determined match or correspondence between the portions of HTTP request 248 and linking data 250), merchant system 110 may perform operations that obtain the elements of formatted invoice data 218 from data repository 220, and that transmit the elements of formatted invoice data 218 across network 120 to FI computing system 130, e.g., as a response to HTTP request 248.

Executed remittance analysis engine 240 may receive the elements of formatted invoice data 218 from merchant system 110, and may perform any of the exemplary processes described herein to parse the elements of formatted invoice data 218 (e.g., in a received format, such as a PDF or HTML form, or in a transformed or enhanced format, etc.) and obtain, from the parsed elements of formatted invoice data 218, one or more of the additional, or alternate, elements of customer data 206, payment data 208, transaction data 210, or counterparty data 212. By way of example, executed remittance analysis engine 240 may apply one or more optical character recognition (OCR) processes or optical word recognition (OWR) processes to the elements of formatted invoice data 218 in PDF form to generate, or obtain, elements of textual content representative of the data that characterize user 101, the first retailer, the requested payment, or the initiated purchase of the shirt.

By way of example, executed remittance analysis engine 240 may perform operations that detect a presence one or more keywords within the generated elements of textual content (e.g., "time," "shirt," "date," "UPC," etc.), and may extract elements of the textual content associated with these keywords as corresponding ones of the additional, or alternate, elements of customer data 206, payment data 208, transaction data 210, or counterparty data 212. In other examples, executed remittance analysis engine 240 may detect a presence of the additional, or alternate, elements of customer data 206, payment data 208, transaction data 210, or counterparty data 212 within the generated textual content based on an application of one or more adaptively trained machine learning or artificial intelligence models to portions of the textual content, and examples of these adaptively trained machine learning or artificial intelligence models includes a trained neural network process (e.g., a convolutional neural network, etc.) or a decision-tree process that ingests input datasets composed of all, or selected portions, of the textual content. The disclosed embodiments are, however, not limited to exemplary processes for detecting and extracting one or more of the additional, or alternate, elements of customer data 206, payment data 208, transaction data 210, or counterparty data 212 from the generated textual content, and in other instances, executed remittance analysis engine 240 may perform any additional, or alternate, process for identifying one or more of the additional, or alternate, elements of customer data 206, payment data 208, transaction data 210, or counterparty data 212 within the textual content derived from the processing of the elements of formatted invoice data 218 in PDF format.

Further, and as described herein, the elements of formatted invoice data 218 may be structured in HTML form, and may include metadata that identify and characterize user 101 (e.g., the customer name, etc.), the first retailer (e.g., the name or other identifier, etc.), the requested payment (e.g., a payment amount, etc.), or the initiated purchase of the shirt. Executed remittance analysis engine 240 may perform operations that detect one or more of the elements of metadata within the elements of formatted invoice data 218, and that obtain, from the elements of metadata, additional, or alternate, elements of customer data 206, payment data 208, transaction data 210, or counterparty data 212, as described herein. The disclosed embodiments are, however, not limited to these exemplary processes for detecting and extracting the additional, or alternate, elements of customer data 206, payment data 208, transaction data 210, or counterparty data 212 from HTML-formatted invoice data 218, and in other instances, executed remittance analysis engine 240 may perform any additional, or alternate, process detecting and obtaining data from the elements of formatted invoice data 218 structured in HTML form, including, but not limited to, an application of one or more screen-scraping processes to elements of formatted invoice data 218 structured in HTML form.

In some instances, executed remittance analysis engine 240 may also perform any of the exemplary operations described herein to process the elements of formatted invoice data 218, structured in PDF or HTML form, and extract one or more of the additional elements of transaction data that further characterize the $50.00 purchase of the shirt from Sam's Haberdashery on May 30, 2022, at 10:30 a.m. By way of example, the additional elements of transaction data may include, but are not limited to, one or more identifiers of the purchased shirt (e.g., the product name, the corresponding UPC or SKU, etc.), the 10:30 a.m. transaction time, the May 30, 2022, transaction date, the total transaction amount of $50.00, a subtotal of $45.00 for the shirt, and the $5.00 in imposed local sales tax. Executed remittance analysis engine 240 may perform operations that store the additional elements of transaction data within portions of transaction data 210 of decomposed field data 204.

In some instances, executed decomposition engine 146 may perform operations that store decomposed field data 204, which includes the element of customer data 206, payment data 208, transaction data 210, or counterparty data 212, and remittance information 214 (including URL 216), within a corresponding portion of data repository 134, for example, in conjunction with RFP message 202A within a portion of RTP data store 144. Further, and based on the elements of field mapping data 138A, executed decomposition engine 146 may perform also perform any of the exemplary processes described herein to operations that parse each of RFP messages 202B and 202C, and obtain, respectively, elements of decomposed field data 252 and decomposed field data 266 that identify and characterize the customer (e.g., user 101 of client device 102), a corresponding counterparty (e.g., the second retailer, "Woody's Suits," and the third retailer, "Claude's Clothes," respectively), corresponding ones of the requested, real-time payments, and corresponding ones of the initiated purchase transactions.

By way of example, and based on the elements of field mapping data 138A, executed decomposition engine 146 may perform any of the exemplary processes described herein to parse the elements of RFP message 202B, and obtain the customer name, the postal address of user 101, and a name of the second retailer ("Woody's Suits") and a postal address associated with the second retailer (e.g., "3320 Cady's Alley N.W., Washington, D.C., 20007"), and to package the name and postal address of user 101, and the name and postal address of the second retailer, within respective portions of customer data 254 and counterparty data 260 of decomposed field data 25. Further, and based on the elements of field mapping data 138A, executed decomposition engine 146 may perform any of the exemplary processes described herein to obtain, from one or more additional message fields of RFP message 202B, the requested payment date (e.g., "May 30, 2022"), the requested payment amount (e.g., $75.00) and the requested payment currency (e.g., "USD"), an identifier of the payment instrument selected by user 101 to fund the initiated purchase transaction (e.g., the account number "XXXX-1234-5678-9012" of the deposit account), and an identifier of an account associated with the second retailer and available to receive the requested $75.00 payment. As described herein, executed decomposition engine 146 may perform operations that package the requested payment date, the requested payment amount (and the requested payment currency), and the identifiers of the payment instrument of user 101 and the account of the second retailer within corresponding portions of payment data 256 of decomposed field data 252.

Executed decomposition engine 146 may also perform any of the exemplary processes described herein that, based on the elements of field mapping data 138A, obtain elements of transaction data that characterize the second purchase transaction, e.g., the $75.00 purchase of the pants at 11:15 a.m. on May 30, 2022, from Woody's Suits in Washington, D.C. (e.g., one or more of the exemplary elements of transaction data described herein), and that package the obtained elements of transaction data within corresponding portions of transaction data 258 of decomposed field data 252. Further, executed decomposition engine 146 may also determine, based on the elements of field mapping data 138A, that one or more message fields of RFP message 202B includes structured or unstructured elements of remittance data that characterizes further the requested payment, the second purchase transaction, user 101, or the second retailer, and executed decomposition engine 146 may obtain the structured or unstructured elements of remittance data from the one or more message fields of RFP message 202B and package the obtained elements of remittance data into corresponding portions of remittance information 262 of decomposed field data 252.

By way of example, the structured or unstructured elements of remittance data maintained within the message fields of RFP message 202B may include a link (e.g., a shortened or tiny URL, a long-form URL, etc.) to formatted invoice data associated with the requested $75.00 payment and maintained by a corresponding computing system associated with the second retailer, such as merchant system 114. Although not illustrated in FIG. 2A, executed remittance analysis engine 240 may perform any of the exemplary processes described herein to programmatically access the elements of formatted invoice data associated with the requested $75.00 payment that are maintained at merchant system 114, to process the formatted invoice data (e.g., in PDF or HTML form), and to obtain one or more additional elements of customer data 254, payment data 256, transaction data 258, or counterparty data 260. As described herein, the additional elements of transaction data 258 may include, but are not limited to, one or more identifiers of the purchased pants (e.g., a product name, a corresponding UPC or SKU, etc.), the 11:15 a.m. transaction time, the May 30, 2022, transaction date, the total transaction amount of $75.00, a subtotal of $67.50, and $7.50 in imposed local sales tax.

Further, and based on the elements of field mapping data 138A, executed decomposition engine 146 may also perform any of the exemplary processes described herein to parse the elements of RFP message 202C, and obtain the customer name, the postal address of user 101, and a name of the third retailer ("Claude's Clothing") and a postal address associated with the third retailer (e.g., "3077 M St N.W., Washington, D.C., 20007"), and to package the name and postal address of user 101, and the name and postal address of the third retailer, within respective portions of customer data 268 and counterparty data 274 of decomposed field data 266. Further, and based on the elements of field mapping data 138A, executed decomposition engine 146 may perform any of the exemplary processes described herein to obtain, from one or more additional message fields of RFP message 202C, the requested payment date (e.g., "May 30, 2022"), the requested payment amount (e.g., $175.00) and the requested payment currency (e.g., "USD"), an identifier of the payment instrument selected by user 101 to fund the third purchase transaction (e.g., the account number "XXXX-1234-5678-9012" of the deposit account), and an identifier of an account associated with the third retailer available to receive the requested $175.00 payment. As described herein, executed decomposition engine 146 may perform operations that package the requested payment date, the requested payment amount (and the requested payment currency), and the identifiers of the payment instrument of user 101 and the account of the third retailer within corresponding portions of payment data 270 of decomposed field data 266.

Executed decomposition engine 146 may also perform any of the exemplary processes described herein that, based on the elements of field mapping data 138A, obtain, from the message field of RFP message 202C, elements of transaction data that characterize the third purchased transaction, e.g., the $175.00 purchase of the jacket at 12:30 p.m. on May 30, 2022, from Claude's Clothing in Washington, D.C., and that package the obtained elements of transaction data within corresponding portions of transaction data 272 of decomposed field data 266. Further, executed decomposition engine 146 may also determine, based on the elements of field mapping data 138A, that one or more message fields of RFP message 202C include structured or unstructured elements of remittance data that characterizes further the requested payment, the third purchase transaction, user 101, or the third retailer, and executed decomposition engine 146 may obtain the structured or unstructured elements of remittance data from the one or more message fields of RFP message 202C and package the obtained elements of remittance data into corresponding portions of remittance information 276 of decomposed field data 266.

By way of example, the structured or unstructured elements of remittance data maintained within the message fields of RFP message 202B may include a link (e.g., a shortened or tiny URL, a long-form URL, etc.) to formatted invoice data associated with the requested $175.00 payment and maintained by a corresponding computing system associated with the third retailer, such as merchant system 118. In some instances, executed remittance analysis engine 240 may perform any of the exemplary processes described herein to programmatically access the elements of formatted invoice data associated with the requested $175.00 payment that are maintained at merchant system 118, to process the formatted invoice data (e.g., in PDF or HTML form), and to obtain one or more additional elements of customer data 268, payment data 270, transaction data 272, or counterparty data 274 of decomposed field data 266. As described herein, the additional elements of transaction data 272 may include, but are not limited to, one or more identifiers of the purchased jacket (e.g., a product name, a corresponding UPC or SKU, etc.), the 12:30 p.m. transaction time, the May 30, 2022, transaction date, the total transaction amount of $175.00, a subtotal of $157.50, and $17.50 in imposed local sales tax.

In some instances, executed decomposition engine 146 may perform operations that store decomposed field data 252, which includes the elements of customer data 254, payment data 256, transaction data 258, counterparty data 260, and remittance information 262, within a corresponding portion of data repository 134, for example, in conjunction with RFP message 202B within a portion of RTP data store 144. Further, executed decomposition engine 146 may also perform operations that store decomposed field data 266, which includes the element of customer data 268, payment data 270, transaction data 272, counterparty data 274, and remittance information 276, within a corresponding portion of data repository 134, for example, in conjunction with RFP message 202C within a portion of RFP data store 144. Further, executed decomposition engine 146 may also perform any of the exemplary processes described herein, either alone or in conjunction with executed remittance analysis engine 240, to "decompose" one or more additional, or alternate, RFP messages maintained within RFP queue 135 into elements of decomposed field data that include corresponding elements of customer data, counterparty data, payment data, transaction data, and remittance information, and to store the corresponding elements of decomposed field data within a corresponding portion of data repository 134, such as within RTP data store 144.

Executed decomposition engine 146 may also perform operations that provide the elements of decomposed field data associated with one or more of the RFP messages maintained within RFP queue 135, including elements of decomposed field data 204, 252, and 266 associated with corresponding ones of RFP messages 202A, 202B, and 202C, as inputs to analytical engine 148 executed by the one or more processors of FI computing system 130. Upon execution by the one or more processors of FI computing system 130, executed analytical engine 148 may perform any of the exemplary processes described herein that, based on an analysis of the elements of decomposed field data 204, 252, and 258 characterizing respective ones of the first, second, and third purchase transactions initiated by user 101 during a prior temporal interval (e.g., a two-hour interval between 10:30 a.m. and 12:30 p.m. on May 30, 2022), predict an occurrence of one or more additional purchases transactions during a future temporal interval that would be consistent with a transactional behavioral of user 101 during the prior temporal interval. Executed analytical engine 148 may also perform any of the exemplary processes described processes described herein to "pre-approve" user 101 for an available credit or loan product, such as an unsecured installment loan or an unsecured personal loan, in an amount sufficient to fund both the purchase transactions initiated by user 101 during the prior temporal interval and the predicted occurrences of the additional purchase transactions during the future temporal interval based on, among other things, an application of one or more internal qualification or underwriting criteria to data characterizing user 101, and interactions between user 101 and the financial institution or one or more unrelated financial institution, and a use, or misuse, of financial product provisioned by the financial institution of the unrelated financial institutions.

Figure 3A:
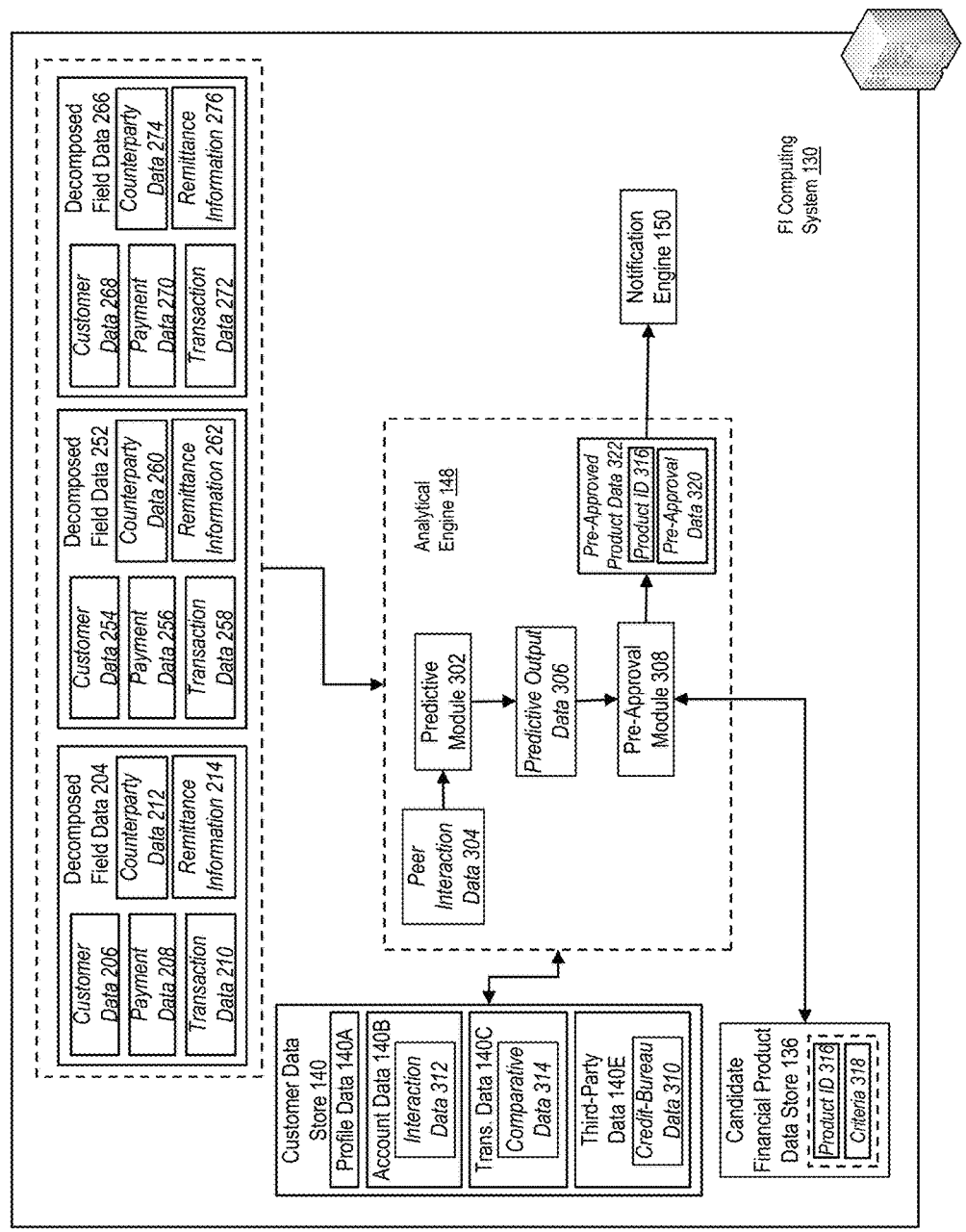
FIGS. 3A, 3B, and 3C are block diagrams illustrating portions of an exemplary computing environment, in accordance with some exemplary embodiments.

Referring to FIG. 3A, executed analytical engine 148 may receive the elements of decomposed field data 204, 252, and 266 (e.g., associated with corresponding ones of RFP messages 202A, 202B, and 202C) from executed decomposition engine 146. In some instances, a predictive module 302 of executed analytical engine 148 may perform operations that, among other things, access the elements of transaction and counterparty data maintained within each of decomposed field data 204, 252, and 266, and obtain information that characterizes the each of the counterparties involved the purchase transactions initiated by user 101 during the prior temporal interval, and values of parameters that characterize each of the purchase transactions initiated by user 101 during the prior temporal interval. The obtained counterparty information, for example, include a counterparty identifier of each of the counterparties (e.g., a counterparty name, a standard industrial classification (SIC) code, etc.) and geographic data characterizing each of the counterparties (e.g., a portion of a corresponding postal address, etc.), and parameter values may include, but are not limited, a transaction date or time, a transaction value, and identifiers of one or more products or services involved in corresponding ones of the first, second, and third purchase transactions.

By way of example, executed predictive module 302 may obtain, from the elements of counterparty data 212 maintained within decomposed field data 204, a counterparty name of the first retailer (e.g., "Sam's Haberdashery") and the postal address of the first retailer (e.g., "3262 M St N.W., Washington, D.C., 20007"), and may obtain, from the elements of transaction data 210 maintained within decomposed field data 204, transaction parameter values for the first purchase transaction that include the 10:30 a.m. transaction time, the May 30, 2022, transaction date, the $50.00 transaction amount, and the product identifier of the purchased shirt (e.g., the product name, the UPC or SKU, etc.). Executed predictive module 302 may also obtain, from the elements of counterparty data 260 maintained within decomposed field data 252, a counterparty name of the second retailer (e.g., "Woody's Suits") and the postal address of the first retailer (e.g., "3320 Cady's Alley N.W., Washington, D.C., 20007"), and may obtain, from the elements of transaction data 258 maintained within decomposed field data 252, transaction parameter values of the first purchase transaction that include the 11:15 a.m. transaction time, the May 30, 2022, transaction date, the $75.00 transaction amount, and the product identifier of the purchased pants (e.g., the product name, the UPC or SKU, etc.).

Further, executed predictive module 302 may obtain, from the elements of counterparty data 274 maintained within decomposed field data 266, a counterparty name of the third retailer (e.g., "Claude's Clothing") and the postal address of the first retailer (e.g., "3077 M St N.W. Washington, D.C., 20007"), and may obtain, from the elements of transaction data 258 maintained within decomposed field data 252, transaction parameter values of the third purchase transaction that include the 12:30 p.m. transaction time, the May 30, 2022, transaction date, the $175.00 transaction amount, and the product identifier of the purchased jacket (e.g., the product name, the UPC or SKU, etc.). In some instances, the obtained elements of counterparty data (e.g., the names of the first, second, and third retailers and the geographic data characterizing the first, second, and third retailers) and the obtained parameter values that characterize the first, second, and third purchase transactions may characterize a spending or transaction behavior of user 01 across the prior temporal intervals.

Further, in some instances, executed predictive module 302 may also perform operations that, based on the elements of customer profile data 140A maintained within customer data store 140, identify additional customers of the financial institution that are characterized by a value of one or more demographic parameters that are similar to a corresponding parameter value that characterizes user 101 (e.g., that form a "customer peer group" of user 101). By way of example, the demographic parameters may include, among other things, a customer age or a city of residence of customer, and a value of one of the demographic parameters that characterizes one of the additional customers may be similar to a corresponding parameter value that characterizes user 101 when the parameter value is equivalent to the corresponding parameter value, when parameter value falls within a predetermined, threshold amount of the corresponding parameter value, or when the parameter value is disposed within a specified value range that includes the corresponding parameter value.

By way of example, user 101 may represent a forty-four-year-old resident of Washington, D.C., and the additional customers within the customer peer group of user 101 may reside in Washington, D.C., and may be characterized by an age ranging from thirty-five and forty-four. In some instances, executed predictive module 302 may perform operations that obtain, from the elements of customer profile data 140A, a unique customer identifier of each of the additional customers within the customer peer group (e.g., a customer-specific, alphanumeric identifier assigned by the financial institution), and based on the unique customer identifier associated with each of the customers, obtain one or more elements of account data 140B, transaction data 140C, and third-party data 140D that characterize each of the additional customers during a current temporal interval and/or across one or more temporal intervals. The obtained elements of account data 140B, transaction data 140C, and third-party data 140D obtained for each of the additional customers (e.g., customer-specific elements of peer interaction data 304 of FIG. 3A) may characterize the interactions of each of the additional customer within the financial institution, with one or more unrelated financial institutions, or with financial products provisioned by the financial institution or with the unrelated financial institution during the current or one or more prior temporal intervals, and in some instances, may characterize a spending or transactional behavior of these additional customers during one or more temporal intervals.

Referring back to FIG. 3A, executed predictive module 302 may perform operations that analyze the elements of counterparty and the transaction parameter values that characterize the first, second, and third purchase transactions initiated by user 101 during the prior temporal interval, and in some instances, the customer-specific elements of peer interaction data 304 associated with one or more of the additional customers that establish the customer peer group of user 101. Based on the analysis, executed predictive module 302 may perform operations that predict an occurrence of one or more additional purchases transactions during a future temporal interval that would be consistent with the spending or transactional behavioral of user 101 during the prior temporal interval, and that generate elements of predicted output data 306 that include a value of one or more parameters that characterize each of the predicted occurrence of the additional purchases transactions during the future temporal interval.

In some instances, executed predictive module 302 may perform operations that apply trained machine learning or artificial intelligence process to an input dataset obtained, or extracted from, the elements of counterparty and the transaction parameter values that characterize the first, second, and third purchase transactions initiated by user 101 during the prior temporal interval and in some instances, one or more of the customer-specific elements of peer interaction data 304. Based on the application of the trained machine learning or artificial intelligence process to the input dataset, executed predictive module 302 may generate elements of predicted output data 306 that include, for each of the predicted occurrences of the additional purchase transactions within the future temporal interval, transaction parameter values that include, but are not limited to, a transaction amount, an identifier of a corresponding product or service, a transaction location, and/or an identifier of a corresponding counterparty, such as an additional retailer.

As described herein, examples of the trained machine-learning and artificial-intelligence processes may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning and artificial-intelligence processes may also include, among other things, a decision tree process (e.g., a boosted decision tree algorithm, etc.), a random decision forest, an artificial neural network, a deep neural network, or an association-rule process (e.g., an Apriori algorithm, an Eclat algorithm, or an FP-growth algorithm). Further, and as described herein, each of these exemplary machine-learning and artificial-intelligence processes may be trained against, and adaptively improved using, elements of training and validation data, and may be deemed successfully trained and ready for deployment when a value of one or more performance or accuracy metrics are consistent with one or more threshold training or validation criteria.

For instance, the additional trained machine learning or artificial intelligence process may include a trained decision-tree process, and executed predictive module 302 may obtain, from one or more tangible, non-transitory memories, elements of process input data and process parameter data associated with the trained decision-tree process, such as those described herein (not illustrated in FIG. 3A). In some examples, not illustrated in FIG. 3A, executed predictive module 302 may perform operations that generate one or more discrete elements (e.g., "feature values") of the input dataset in accordance with the elements of process input data and based on the elements of counterparty and the transaction parameter values that characterize the first, second, and third purchase transactions initiated by user 101 during the prior temporal interval and/or one or more of the customer-specific elements of peer interaction data 304. Based on portions of the process parameter data, executed predictive module 302 may perform operations that establish a plurality of nodes and a plurality of decision trees for the trained decision-tree process, each of which receive, as inputs (e.g., "ingest"), corresponding elements of the input dataset. Upon ingestion of the input dataset by the established nodes and decision trees of the trained decision-tree process, executed predictive module 302 may perform operations that apply the additional, trained, decision-tree process to the input dataset, and that generate the elements of predicted output data 306 that include the predicted transaction parameter values characterizing each of the predicted occurrences of the additional purchase transactions within the future temporal interval, and in some instances, a total transaction amount characterizing those purchase transactions initiated during the prior temporal interval and the predicted occurrences of the additional purchase transactions during the future temporal interval.

By way of example, user 101 initiated the first purchase transaction for the $50.00 shirt from the first retailer (e.g., "Sam's Haberdashery") at 10:30 a.m. on May 30, 2022, the second purchase transaction for the $75.00 pants from the second retailer (e.g., "Woody's Suits") at 11:15 a.m. on May 30, 2022, and the third purchase transaction for the $175.00 jacket from the third retailer ("Claude's Clothes") at 12:30 p.m. on May 30, 2022. In some instances, based on the elements of counterparty and the transaction parameter values that characterize the first, second, and third purchase transactions initiated by user 101 during the prior, two-hour temporal interval and in some instances, one or more of the customer-specific elements of peer interaction data 304, executed prediction module 302 may perform any of the exemplary processes described herein to establish that user 101 intended to purchase apparel from retailers disposed within the Georgetown neighborhood of Washington, D.C. (e.g., postal code 20007), and further, to predict an occurrence of at least one additional purchase transaction for shoes in an amount of $75.00 from a fourth retailer in the Georgetown neighborhood of Washington, D.C., during a future temporal interval, e.g., a temporal interval extending until 5:00 p.m. on May 30, 2022.

In some instances, the predicted occurrence of the at least one additional purchase transaction (e.g., the purchase of the shoes in the amount of $75.00) may be consistent with determined intent of user 101 (e.g., the purchase of apparel within the Georgetown neighborhood of Washington, D.C.), and executed predictive module 302 may generate elements of predicted output data 306 that specify values of one or more transaction parameters that characterize the predicted occurrence of the additional purchase transaction during the future temporal interval, such as, but not limited to, the $75.00 transaction amount, an identifier of the product involved in the additional purchase transaction (e.g., a product name for the shoes), and geographic data characterizing the additional purchase transaction (e.g., the postal code "20007"). Further, the elements of predicted output data 306 may also include an aggregate transaction amount of $375.00 attributable to the first, second, and third purchase transactions initiated by user 101 during the prior temporal interval (e.g., an aggregate transaction amount of $300.00) and the predicted occurrence of the additional purchase transaction during the future temporal interval (e.g., $75.00).

As illustrated in FIG. 3A, executed predictive module 302 may provide the elements of predicted output data 306 as an input to a pre-approval module 308 of executed analytical engine 148. Upon execution by the one or more processors of FI computing system 130, executed pre-approval module 308 may access candidate financial product data store 136 (e.g., as maintained within data repository 134 of FIG. 1), and obtain information identifying a candidate credit or loan products that is available for provisioning to user 101 and, if provisioned, would be appropriate to fund not only the $300 transaction amount associated with the first, second, and third purchase transactions initiated during the prior, two-hour temporal interval, but also the predicted occurrence of the additional, $75.00 purchase transaction during the future temporal interval. Examples of these candidate credit or loan products include, but are not limited to, an unsecured personal loan or installment loan having a fixed or variable interest rate, a line-of-credit secured against other customer asserts, or other secured or unsecured credit products, and the information obtained from candidate financial product data store 136 may, for the candidate credit or loan product, include one or more internal qualification or underwriting criteria that establish an availability of the candidate credit or loan product to user 101 and enable the financial institution to establish customer- or product-specific terms and conditions.

By way of example, executed pre-approval module 308 may access third-party data 140D (e.g., as maintained within customer data store 140), and obtain one or more elements of credit-bureau data 310 associated with user 101, such as, but not limited to, a credit score or a number of credit inquiries during a current or prior temporal interval. Executed pre-approval module 308 may also access account data 140B and transaction data 140C, and may obtain information that characterize interactions between user 101 and the financial institution, and with financial products provisioned by the financial institution, across a current and one or more prior temporal intervals (e.g., that characterize a spending or transactional behavior during these temporal intervals).

The information obtained from account data 140B may, in some instances, include elements of interaction data 312 that characterize interactions between user 101 and financial products issued by the financial institution across one or more temporal intervals. For example, interaction data 312 may include, among other things, outstanding balances associated with one or more of the financial products (e.g., outstanding balances associated with one or more credit-card accounts or unsecured personal loans, etc.), a current status of one or more of the financial products (e.g., no overdue balances, delinquent, default, etc.), and cashflow metrics associated with one or more of the financial products (e.g., a net cashflow though a deposit account, etc.). Further, in some instances, executed pre-approval module 308 may also obtain elements of comparative data 314 that identify, characterize, and compare seasonal or year-over-year variations in a spending and transactional habit of user 101. By way of example, comparative data 314 may include the aggregate transaction amount of $300.00 due to the first, second, and third purchase transactions initiated by user 101 on May 30, 2022, and aggregate transactions amounts associated with purchase transactions initiated by user 101 on May 30, 2021, and May 30, 2022, and may enable executed pre-approval module 308 to determine whether the aggregate transaction amount of $300.00 is consistent with, or an outlier from, a seasonal transactional behavior of user 101, e.g., on May 30, 2022.

Referring back to FIG. 3A, executed pre-approval module 308 may obtain, from candidate financial product data store 136, a product identifier 316 of a particular one of the credit or loan products, such as an unsecured installment loan characterized by a fixed interest rate, and one or more internal qualification or underwriting criteria 318 that establish an availability of the unsecured installment loan to user 101 and enable the financial institution to establish customer- or product-specific terms and conditions for the unsecured installment loan. In some instances, and based on an application of one or more internal qualification or underwriting criteria 318 to the elements of predicted output data 306 (e.g., including the $75.00 transaction amount associated with the predicted occurrence of the additional purchase transaction during the future temporal interval and the $375.00 aggregate transaction amount across the prior and future temporal intervals), the elements of credit-bureau data 310, and/or on the information characterizing the interactions between user 101 and the financial institution and/or with the financial products provisioned by the financial institution (including the elements of interaction data 312 and comparative data 314), executed pre-approval module 308 may establish that one of the unsecured, fixed-rate installment loan is available for provisioning to user 101 and available to fund the $375.00 aggregate transaction amount, and may determine one or more customer-specific terms and conditions of the available, unsecured, fixed-rate installment loan.

By way of example, and in accordance with the one or more internal qualification or underwriting criteria 318, executed pre-approval module 308 may perform operations that pre-approve the provisioning of the unsecured, fixed-rate installment loan in amount of $375.00 (e.g., the aggregate transaction amount across the prior and future temporal intervals) and based on determined terms and conditions that include, but are not limited to, a fixed interest rate of 6.0%, a five-month term, and five, equal monthly payments of $76.00 (including $75.00 in principal and $1.00 in interest). In some instances, executed pre-approval module 308 may package information characterizing the determined terms and conditions of the pre-approved, unsecured, fixed-rate installment loan, including the $375.00 loan amount, the fixed, 6.0% interest rate, the five-month term, and the $76.00 monthly payments, into corresponding elements of pre-approval data 320. Further, as illustrated in FIG. 3A, executed pre-approval module 308 may also package product identifier 316 of the unsecured, fixed-rate installment loan (e.g., product name, etc.), and the elements of pre-approval data 320 into corresponding portions of pre-approved product data 322, which executed pre-approval module 308 may provide as an input to notification engine 150.

Upon execution by the one or more processors of FI computing system 130, executed notification engine 150 may perform any of the exemplary processes described herein to generate elements of notification data that identify, and characterize, the available, unsecured installment loan, the loan amount of $375.00, and the pre-approved terms and conditions (e.g., the fixed, 6.0% interest rate, the five-month term, and the $76.00 monthly payment), and to transmit the elements of notification data across network 120 to client device 102, e.g., for presentation within a corresponding digital interface. In some instances, executed notification engine 150 may generate and transmit the elements of notification data to client device 102, and client device 102 may perform operations that render the elements of notification data for presentation within the digital interface, in real-time and contemporaneously with the receipt of RFP messages 202A, 202B, and 202C, and prior to an execution of all, or at least one of, the real-time payments requested by corresponding ones of RFP messages 202A, 202B, and 202C, and prior to an initiation of the predicted, additional purchase transaction during the future temporal interval. Certain of these exemplary processes, when implemented collectively by FI computing system 130 and client device 102, may present to user 101 a targeted offer of a directed loan product capable of funding not only the one or more purchase transactions initiated during the prior temporal interval, but also one or more predicted occurrences of purchase transactions consistent with a determined intent of the initiated purchase transactions, in real-time during, or prior to, an initiation of the one or more additional purchase transactions during the future temporal interval, e.g., while user 101 shops for shoes in the Georgetown neighborhood of Washington, D.C., to complete the previously purchased shirt, pants, and jacket.

Figure 3B:
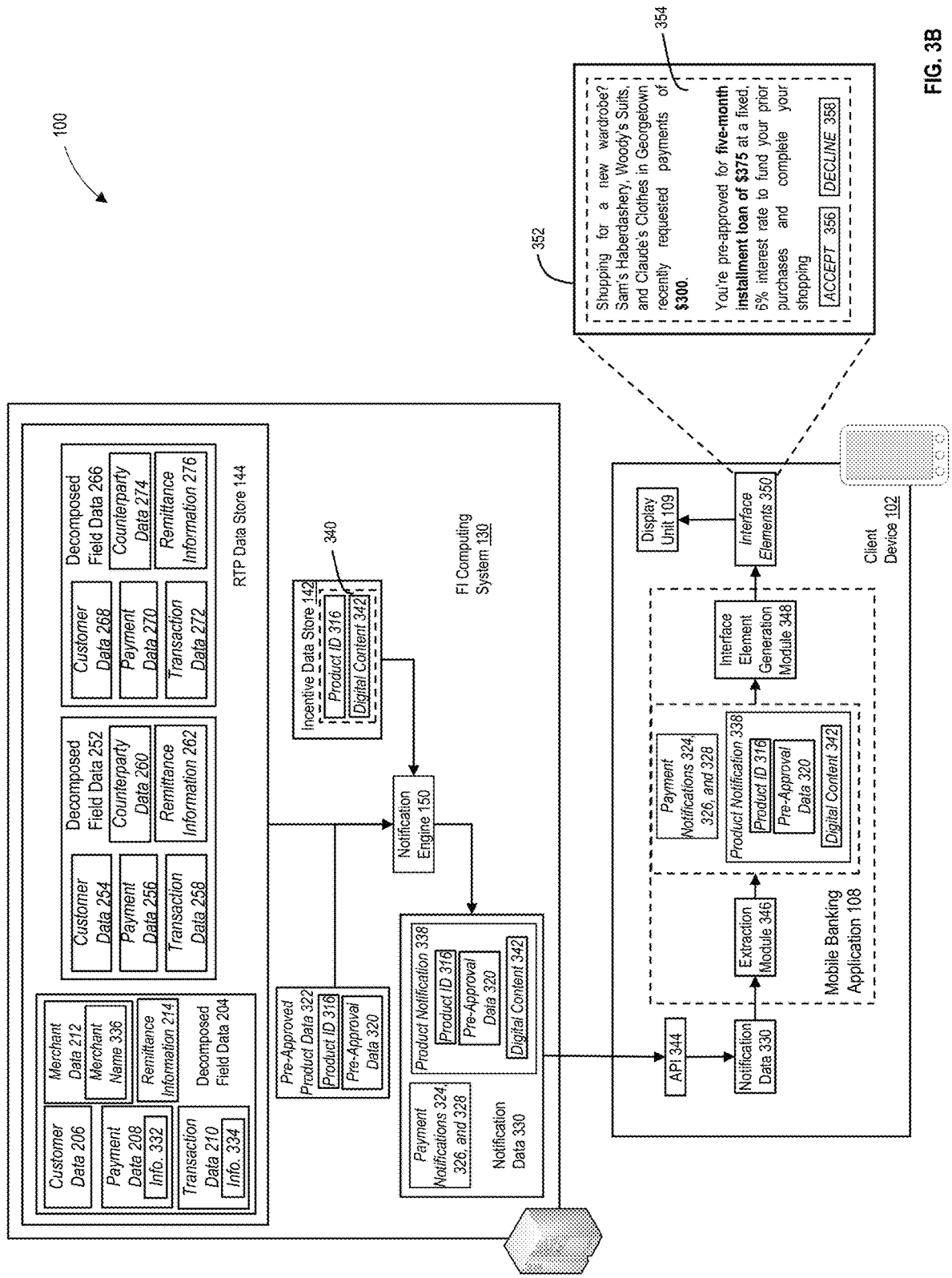

Referring to FIG. 3B, executed notification engine 150 may receive pre-approved product data 322 from executed analytical engine 148, and executed notification engine 150 may perform operations that access RTP data store 144 and obtain elements of decomposed field data 204, 252, and 266 associated with corresponding ones of RFP messages 202A, 202B, and 202C. As described herein, decomposed field data 204 may include elements of customer data 206, payment data 208, transaction data 210, counterparty data 212, and remittance information 214 that collectively identify and characterize the request, from the first retailer (e.g., "Sam's Haberdashery"), for the real-time payment of $50.00 from user 101 for the purchase of the shirt initiated at 10:30 a.m. on May 30, 2022. Further, decomposed field data 252 may include elements of customer data 254, payment data 256, transaction data 258, counterparty data 260, and remittance information 262 that collectively identify and characterize the request, from the second retailer (e.g., "Woody's Suits") on May 30, 2022, for the real-time payment of $75.00 from user 101 for the purchase of the pants initiated at 11:15 a.m. on May 30, 2022. As described herein, decomposed field data 266 may include elements of customer data 268, payment data 270, transaction data 272, counterparty data 274, and remittance information 276 that collectively identify and characterize the request, from the third retailer (e.g., "Claude's Clothes") on May 30, 2022, for the real-time payment of $175.00 from user 101 for the purchase of the jacket initiated at 12:30 p.m. on May 30, 2022.

In some instances, and based on portions of decomposed field data 204, 252, and 266, executed notification engine 150 may perform operations that generate payment notifications 324, 326, and 328 associated with, respectively, the $50.00 real-time payment requested by the first retailer, the $75.00 real-time payment requested by the second retailer, and the $175.00 real-time payment requested by the third retailer, and that package each of payment notifications 324, 326, and 328 into a corresponding portion of notification data 330. For example, and for the $50.00 real-time payment requested by the first retailer, executed notification engine 150 may parse payment data 208 to obtain payment information 332 that identifies the requested payment date of May 30, 2022 and the payment instrument selected by user 101 to fund the purchase transaction (e.g., the account number "XXXX-1234-5678-9012" of the deposit account held by user 101). Executed notification engine 150 may also parse transaction data 210 to obtain information 334 that identifies the requested $50.00 payment amount and payment currency of US dollars, and may parse counterparty data 212 to obtain a name 336 of the first retailer (e.g., a name of the first retailer "Sam's Haberdashery").

In some examples, executed notification engine 150 may perform operations that package all, or selected portion of, information 332, information 334, and merchant name 336 into corresponding portions of payment notification 324, which may be incorporated within notification data 330. Further, although not illustrated in FIG. 3B, executed notification engine 150 may perform similar operations to generate payment notification 326 based on corresponding portions of customer data 254, payment data 256, transaction data 258, counterparty data 260, and remittance information 262 maintained within the elements of decomposed field data 252, and to generate payment notification 328 based on corresponding portions of customer data 268, payment data 270, transaction data 272, counterparty data 274, and remittance information 276 maintained within the elements of decomposed field data 266.

Further, executed notification engine 150 may parse pre-approved product data 322 and obtain product identifier 316 of the pre-approved, unsecured installment loan (e.g., a product name, etc.) and the elements of pre-approval data 320, which identify the loan amount (e.g., $375.00) and the pre-approved terms and conditions (e.g., the fixed, 6.0% interest rate, the five-month term, and the $76.00 monthly payment), and executed notification engine 150 may package all, or a subset of, product identifier 316 and the elements of pre-approved product data 322 (e.g., the $375.00 loan amount, and the pre-approved terms and conditions) into a product notification 338. Further, executed notification engine 150 may access incentive data store 144, identify one or more data records, such as data record 340, that includes or references product identifier 316. In some instances, data record 340 may include one or more elements of digital content 342 that, when rendered for presentation within a digital interface by client device 102, offers the pre-approved, unsecured installment loan to user 101 in accordance with the terms and conditions, and prompts user 101 to accept, or alternatively, decline, the offer to fund not only the $300.00 real-time payments requested by "Sam's Haberdashery," "Woody's Suits," and "Claude's Clothes" during the prior, two-hour temporal interval, but also the predicted additional, $75.00 purchase of shoes from the retailer in the Georgetown neighborhood of Washington, D.C., using the pre-approved, unsecured installment loan subject to the determined terms and conditions (e.g., consistent with user 101's intent to purchase apparel in the Georgetown neighborhood of Washington, D.C. to support user 101's transition to the new position). Executed notification engine 150 may obtain and package the elements of digital content 342 into product notification 338, which executed notification engine 150 may package into a corresponding portion of notification data 330. Executed notification engine 150 may perform additional operations that cause FI computing system 130 to transmit notification data 330 across network 120 to client device 102.

A programmatic interface associated with one or more application programs executed at client device 102, such as an application programming interface (API) 344 associated with mobile banking application 108, may receive notification data 330 and perform operations that cause client device 102 to executed mobile banking application 108 (e.g., through a generation of a programmatic command, etc.). Upon execution by the one or more processors of client device 102, executed mobile banking application 108 may receive notification data 330 from API 344, and a extraction module 346 of executed mobile banking application 108 may parse notification data 330 to obtain one or more of payment notifications 324, 326, and 328 and product notification 338, which includes product identifier 316, pre-approval data 320 (e.g., identifying the pre-approved, unsecured installment loan, the $375.00 loan amount, and the pre-approved terms and conditions) and the elements of digital content 342.

In some instances, extraction module 346 may provide product notification 338 as input to an interface element generation module 348 of executed mobile banking application 108, which may perform operations that generate and route interface elements 350 to display unit 109A. In some instances, when rendered for presentation within a corresponding notification interface 352 by display unit 109A, interface elements 350 provide a graphical representation 354 to user 101 of product notification 338, which identifies the availability of the $375.00 unsecured installment loan to fund the $300.00 in real-time payments requested by "Sam's Haberdashery," "Woody's Suits," and "Claude's Clothes" on May 30, 2022 for the first, second, and third purchase transactions initiated by user 101 during the prior, two-hour temporal interval, and the predicted occurrence of the $75.00 purchase transaction for shoes during the future temporal interval, in accordance with the pre-approved terms and conditions, e.g., within a single display screen or window, or across multiple display screens or windows, of notification interface 352. Further, interface elements 350 may, when presented within notification interface 352, prompt user 101 to accept, or reject, the available, unsecured installment loan by providing further input to a respective one of an "ACCEPT" icon 356 and a "DECLINE" icon 358 presented within notification interface 352.

In some instances, user 101 may elect to accept the offer of the available, unsecured installment loan in accordance with the pre-approved terms and conditions (e.g., the $375.00 loan amount, the fixed, 6.0% interest rate, the five-month term, and the $76.00 monthly payments) and to fund the $300.00 in real-time payments requested by "Sam's Haberdashery," "Woody's Suits," and "Claude's Clothes" on May 30, 2022 using funds provided by the pre-approved, unsecured installment loan. User 101 may provide input to client device 102 (e.g., via input unit 109B) that selects the "ACCEPT" icon 356. Based on the input, executed mobile banking application 108 may perform operations (not illustrated in FIG. 3B), that generate and transmit a response to notification data 330 that includes a product confirmation indicative of user 101's acceptance of the available, unsecured installment loan in accordance with the terms and conditions across network 120 to FI computing system 130.

In some instances, also not illustrated in FIG. 3B, FI computing system 130 may receive the response, and based on the confirmation data, perform operations that access pre-approved product data 322 (e.g., as maintained within data repository 134), and that, in real-time and contemporaneously with the initiation of each of the first, second, and third purchase transaction, complete the internal qualification or underwriting processes for the accepted, unsecured installment loan and issue the unsecured installment loan to user 101 in accordance with the determined terms and conditions, debit the $300.00 from an account associated with the issued, unsecured installment loan, and credit, respectively, the $50.00 to the account associated with the first retailer (e.g., "Sam's Haberdashery") and specified within payment data 208 of decomposed field data 204, the $75.00 to the account associated with the second retailer (e.g., "Woody's Suits") and specified within payment data 256 of decomposed field data 252, and the $175.00 to the account associated with the third retailer (e.g., "Claude's Clothes") and specified within payment data 270 of decomposed field data 266 (e.g., either directly, if the financial institution issues the account associated with the first retailer, the second retailer, or the third retailer, or based on additional ISO-20022-compliant RTP messages exchanged with computing systems associated with other financial institutions). FI computing system 130 may also perform operations that access RFP messages 202A, 202B, and 202C maintained within RFP queue 135 (along with corresponding elements of decomposed field data 204, 252, and 266), and delete RFP messages 202A, 202B, and 202C, and the elements of decomposed field data 204, 252, and 266, from RFP queue 135, e.g., based on the acceptance of the pre-approved, unsecured installment loan by user 101.

Further, FI computing system 130 may also perform operations that transmit one or more messages to merchant systems 110, 114, and 118 that confirm the real-time clearance and settlement of the payments requested by respective ones of the first retailer, the second retailer, or the third retailer, either directly across network 120 or through one or more of computing systems or devices associated with participants in the RTP ecosystem (e.g., additional ISO-20022-compliant messages, etc.). Based on the one or more messages, merchant systems 110, 114, and 118 may perform operations that enable the first retailer, the second retailer, and the third retailer to execute corresponding ones of the initiated purchase transaction and provision the purchased products or services, to user 101.

Figure 3C:
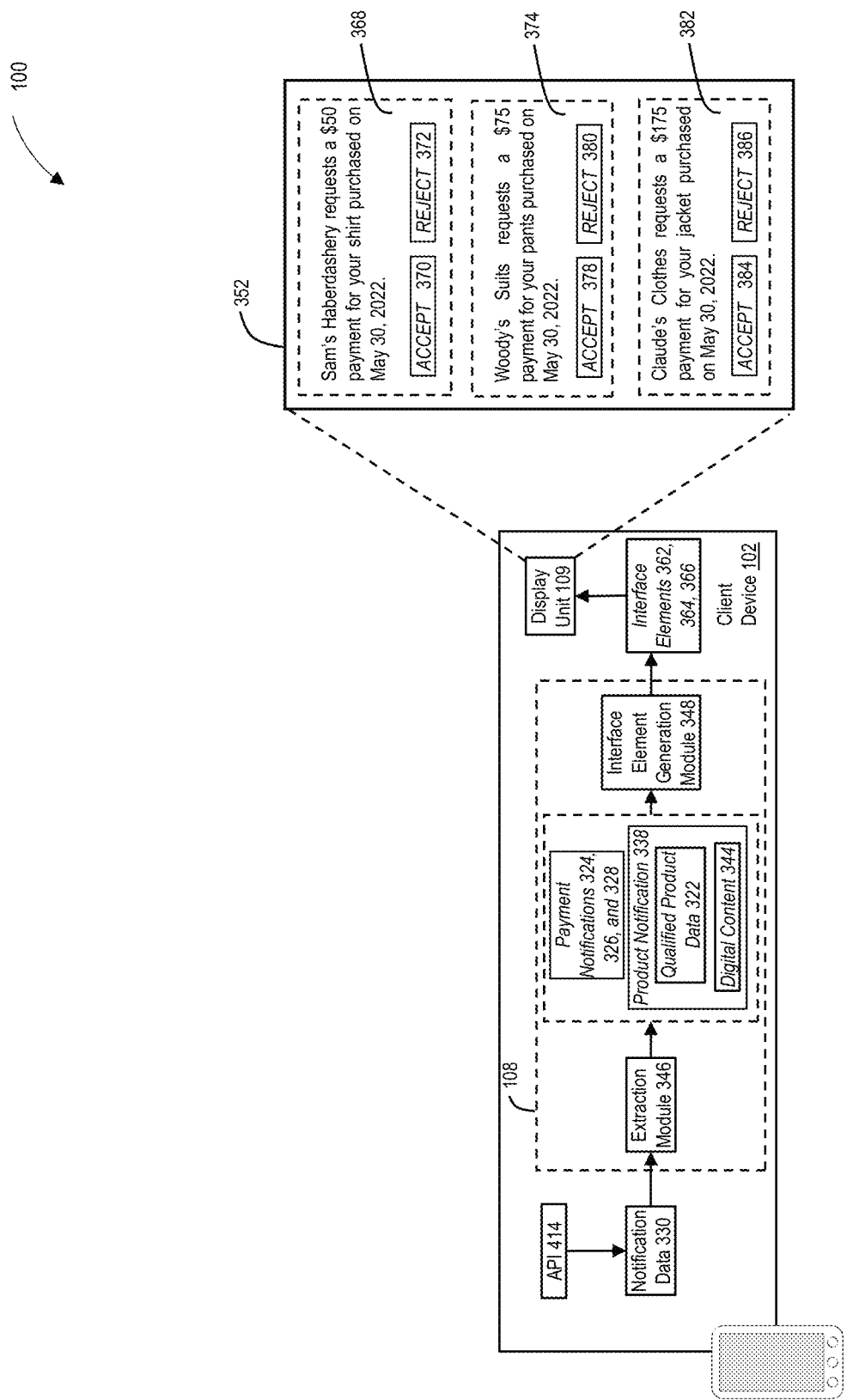

In other instances, user 101 may elect to decline the offer of the unsecured installment loan in accordance with the pre-approved terms and conditions, and user 101 may provide additional input to client device 102 (e.g., via input unit 109B) that selects the "DECLINE" icon 358. Referring to FIG. 3C, and based on the additional input, executed extraction module 346 may route payment notifications 324, 326, and 328 to executed interface element generation module 348, which may perform operations that generate and route corresponding interface elements 362, 364, and 366 to display unit 109A. For example, when presented within notification interface 352 by display unit 109A, interface elements 362 may provide a graphical representation 368 of payment notification 324 that prompts user 101 to approve or reject the $50.00 payment requested by the first retailer (e.g., "Sam's Haberdashery") for the purchased shirt on May 30, 2022, e.g., based on additional input provided to input unit 109B of client device 102 that selects a respective one of an "APPROVE" icon 370 and a "REJECT" icon 372.

Further, when presented within notification interface 352 by display unit 109A, interface elements 364 may provide a graphical representation 374 of payment notification 326 that prompts user 101 to approve or reject the $75.00 payment requested by the second retailer (e.g., "Woody's Suits") for the purchased pants on May 30, 2022, e.g., based on additional input provided to input unit 109B of client device 102 that selects a respective one of an "APPROVE" icon 378 and a "REJECT" icon 380. Additionally, when presented within notification interface 352 by display unit 109A, interface elements 366 may provide a graphical representation 382 of payment notification 328 that prompts user 101 to approve or reject the $175.00 payment requested by the third retailer (e.g., "Claude's Clothes") for the purchased jacket on May 30, 2022, e.g., based on additional input provided to input unit 109B of client device 102 that selects a respective one of an "APPROVE" icon 384 and a "REJECT" icon 386.

User 101 may, for example, elect to approve one or more of the $50.00 payment requested by first retailer (e.g., "Sam's Haberdashery"), the $75.00 payment requested by the second retailer (e.g., "Woody's Suits"), or the $175.00 payment requested by the third retailer (e.g., "Claude's Clothes"), and user 101 may provide input to client device 102 (e.g., via input unit 109B) that selects a corresponding one of "APPROVE" icon 370, 378, or 374. Based on the input, executed mobile banking application 108 may perform operations (not illustrated in FIG. 4B), that generate and transmit an additional response to notification data 330 that include a payment confirmation indicative of each of the one or more approved payments across network 120 to FI computing system 130, which may perform operations that, in real-time, debit an amount of funds consistent with each of the approved payments (e.g., the $50.00, $75.00, and/or $175.00 payment) from an account held by user 101 and associated with the selected payment instrument, and that credit the amount of funds to an account associated with a corresponding one of the first retailer, the second retailer, or the third retailer, either directly across network 120, as specified with a corresponding one of RFP messages 202A, 202B, or 202C (e.g., either directly, if the financial institution issues the account of the corresponding one of the first retailer, the second retailer, or the third retailer, or based on additional ISO-20022-compliant RTP messages exchanged with computing systems associated with other financial institution). FI computing system 130 may also perform operations that access RFP messages 202A, 202B, and 202C maintained within RFP queue 135 (along with corresponding elements of decomposed field data 204, 252, and 266), and delete one or more of RFP messages 202A, 202B, and 202C, and the elements of decomposed field data 204, 252, and 266, that are associated with the approved, real-time payment (or payments) from RFP queue 135.

Further, FI computing system 130 may also perform operations that transmit one or more messages to one or more of merchant systems 110, 114, and 118 associated with the approved, real-time payments, e.g., to confirm the real-time clearance and settlement of the approved, real-time payments requested by respective ones of the first retailer, the second retailer, or the third retailer, either directly across network 120 or through one or more of computing systems or devices associated with participants in the RTP ecosystem (e.g., additional ISO-20022-compliant messages, etc.). Based on the one or more messages, merchant systems 110, 114, or 118 may perform operations that enable the first retailer, the second retailer, or the third retailer to execute corresponding ones of the initiated purchase transactions associated with the approved payments and provision the purchased products or services, to user 101.

In other instances, and based on confirmation data indicating a rejection by user 101 of one or more of the requested real-time payments (e.g., based on additional input selecting corresponding ones of "REJECT" icon 372, 380, and 386), FI computing system 130 may perform operations that access RFP messages 202A, 202B, and 202C maintained within RFP queue 135 (along with corresponding elements of decomposed field data 204, 252, and 266), and delete from RFP queue 135 one or more of RFP messages 202A, 202B, and 202C, and the elements of decomposed field data 204, 252, and 266, that are associated with the rejected, real-time payment (or payments), and generate and transmit one or more messages to corresponding ones of merchant systems 110, 114, and 118 indicative of the rejected payment, either directly across network 120 or through one or more of computing systems or devices associated with participants in the RTP ecosystem (e.g., additional ISO-20022-compliant messages, etc.). Based on the indication of the rejection of the requested payment by user 101 (e.g., due to potential fraud, etc.), corresponding ones of merchant systems 110, 114, and 118 may perform operations that enable the first retailer, the second retailer, or the third retailer, respectively, to cancel the initiated purchase transaction in real-time and without delays and chargebacks characteristic of the transaction reconciliation, clearance, and settlement processes involving payment rails and transaction-processing messages.

Figure 4A:
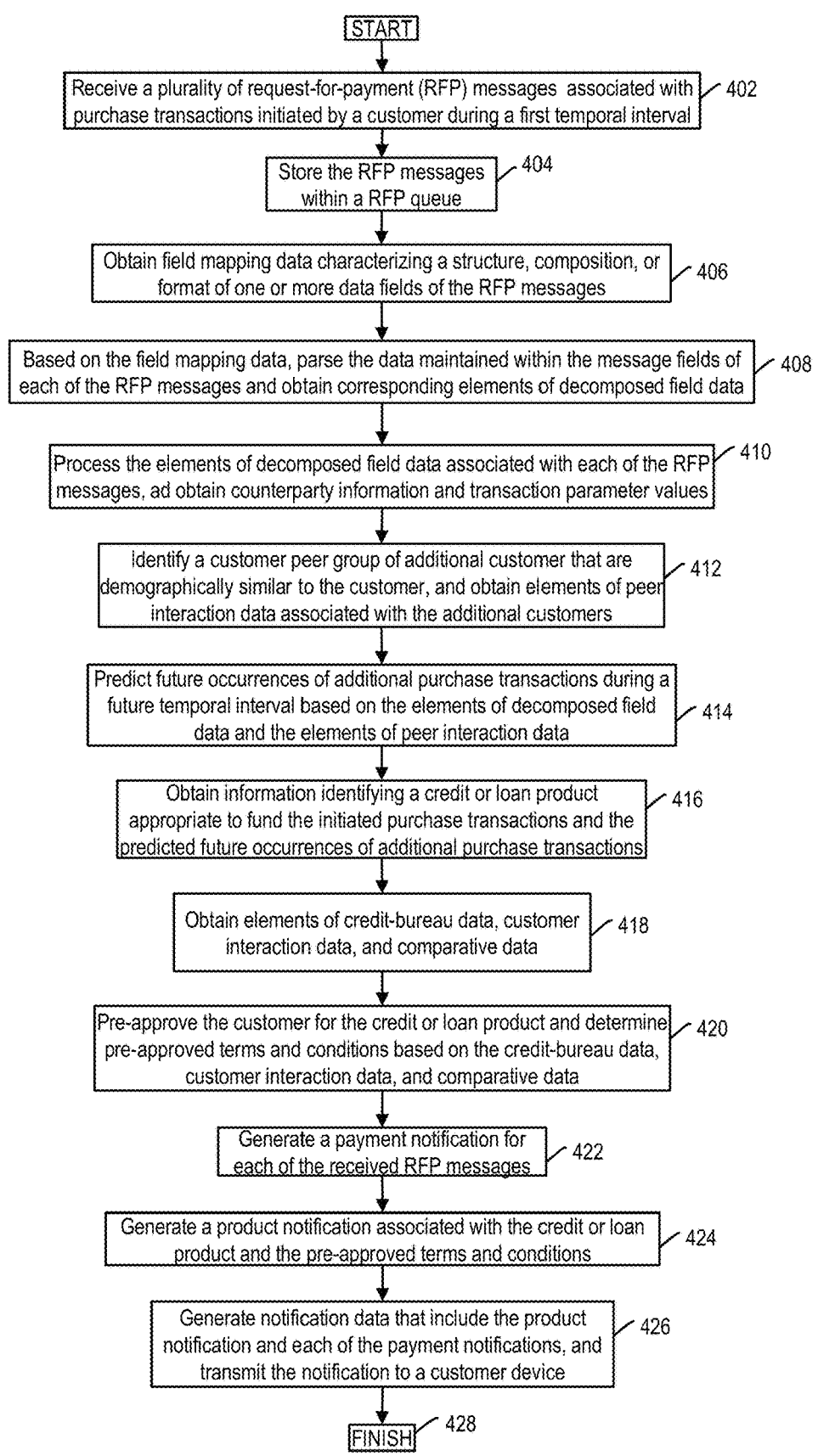
FIGS. 4A, 4B, and 4C are flowcharts of exemplary processes for provisioning directed product data to customer devices based on structured messaging data, in accordance with some exemplary embodiments.
Figure 4B:
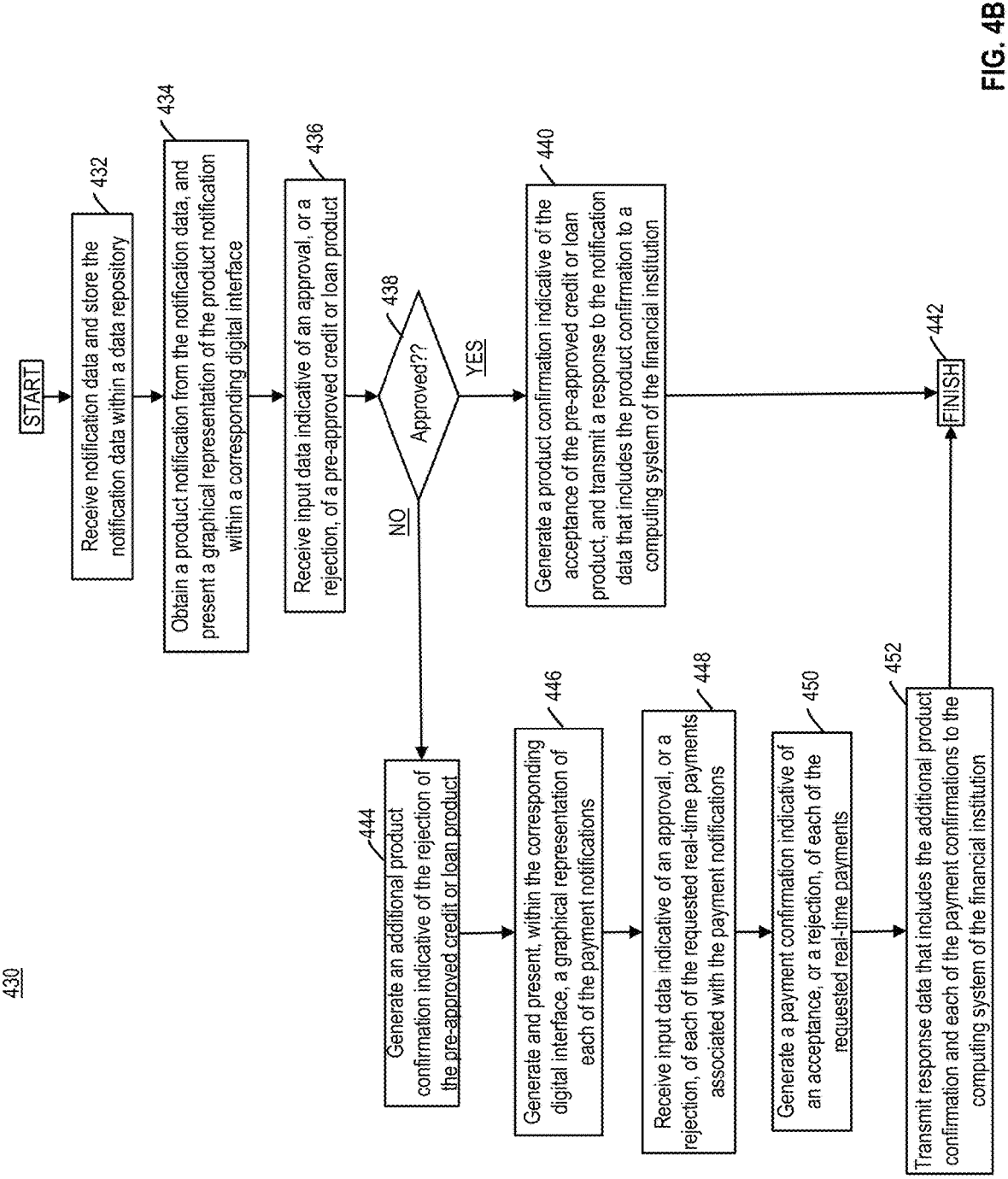
Figure 4C:
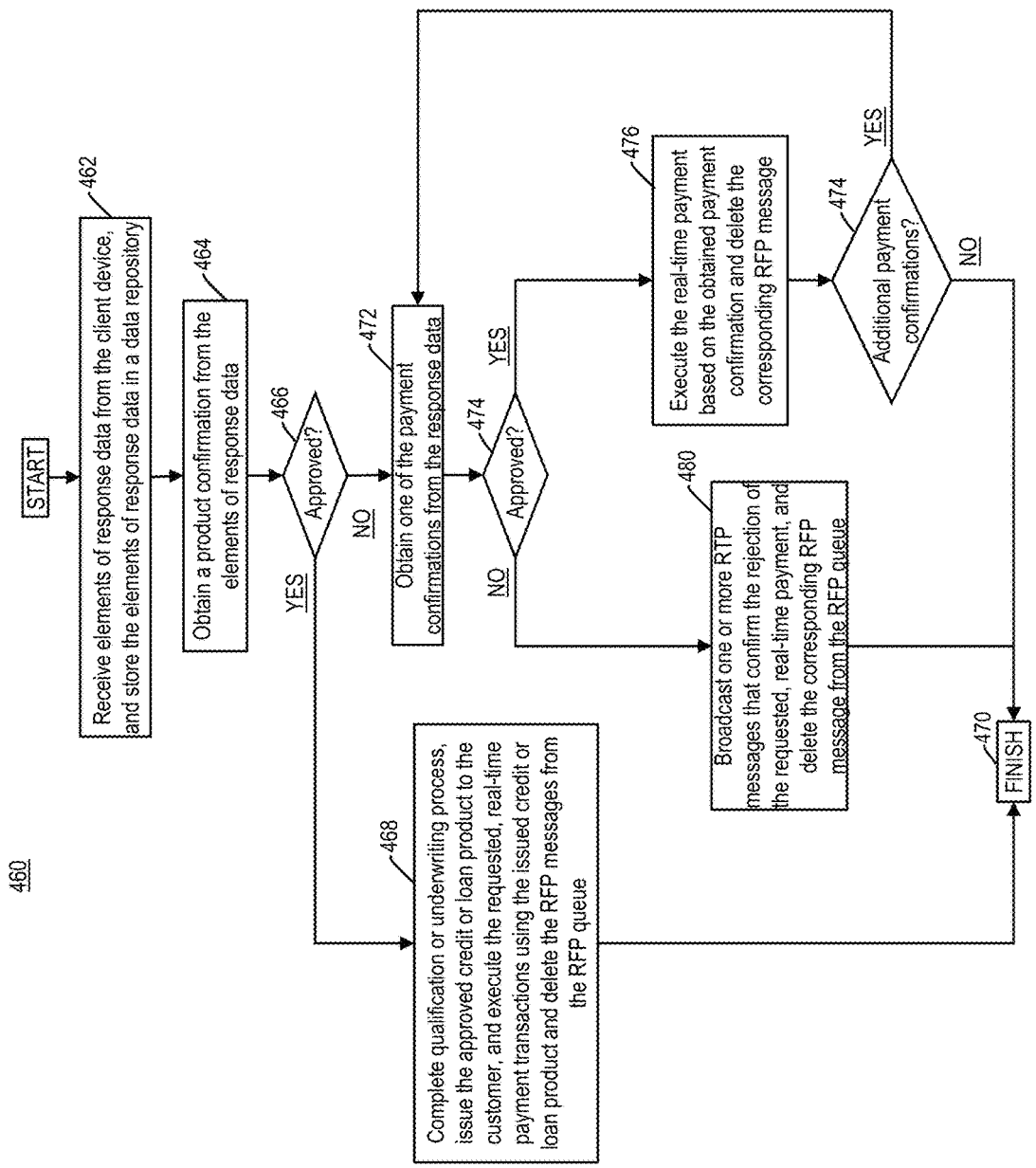

FIGS. 4A, 4B, and 4C are flowcharts of exemplary processes for provisioning directed product data to customer devices based on structured messaging data, in accordance with some exemplary embodiments. For example, one or more computing systems associated with a financial institution, such as FI computing system 130, may perform one or more of the steps of exemplary process 400, as described below in reference to FIG. 4A, and one or more of the steps of exemplary process 460, as described below in reference to FIG. 4C. Further, a computing device associated with, or operable by, user 101, such as client device 102, may perform one or more of the steps of exemplary process 430, as described below in reference to FIG. 4B.

Referring to FIG. 4A, FI computing system 130 may perform any of the exemplary processes described herein to receive a plurality of request-for-payment (RFP) messages having message fields structured in accordance with the ISO 20022 standard (e.g., in step 402 of FIG. 4A), and to store the received RFP message within a message queue (e.g., in step 404 of FIG. 4A). As described herein, each of the RFP messages may be associated with a corresponding exchange of data, such as a purchase transaction, initiated between a first counterparty (e.g., a customer of the financial institution, such as user 101) and a corresponding second counterparty (e.g., one of the first, second, and third retailers associated corresponding ones of merchant systems 110, 114, and 118), and the message fields of each of the RFP messages may include data that identifies and characterizes a real-time payment requested from the first counterparty be the corresponding second counterparty, e.g., to fund a corresponding one of the initiated purchase transactions. Further, in some instances, the first counterparty may initiate each of the purchase transactions during a corresponding temporal interval, e.g., a prior temporal interval that precedes the receipt of the plurality of RFP messages by FI computing system 130.

In some instances, FI computing system 130 may receive each of the RFP messages from a computing system of the corresponding second counterparty (e.g., a corresponding one of merchant systems 110, 114, and 118 of FIG. 1), or from one or more intermediate computing system associated with the RTP ecosystem, such as, but not limited to, a computing system of a clearinghouse. Further, as described herein, each of the RFP messages may be structured in accordance with the ISO 20022 standard for electronic data exchange between financial institutions, and in some examples, each of the RFP messages may correspond to a pain.013 message as specified within the ISO 20022 standard.

FI computing system 130 may also perform operations, described herein, to access mapping data that identifies and characterizes each of the messages fields within the ISO-20022-compliant RFP messages (e.g., in step 406 of FIG. 4A). Based on the mapping data, FI computing system 130 may perform any of the exemplary processes described herein to parse and analyze all or a selected subset of the message fields of each of the RFP messages to extract, obtain, or derive corresponding, discrete elements of decomposed field data that identify and characterize the first counterparty (e.g., user 101, the corresponding second counterparty (e.g., one of the merchants associated with merchant systems 110, 114, or 118), the initiated purchase transaction, and the requested, real-time payment (e.g., in step 408 of FIG. 4A). FI computing system 130 may perform additional operations, described herein, that store the extracted, obtained, or derived data elements of decomposed field data associated with each of the RFP messages, within an accessible data repository, e.g., within an element of RTP data store 144 of FIG. 1.

In other instances, also in step 408, FI computing system 130 may perform any to the exemplary processes described herein to detect, within one or more of the message fields of a corresponding one of the RFP messages, a link to the remittance data associated with the requested, real-time payment or the corresponding initiated purchase (e.g., a link to a PDF or HTML invoice or receipt associated with the corresponding initiated purchase transaction). By way of example, the link may correspond to a long-form uniform resource locator (URL) into which certain elements of data may be embedded, such as, but not limited to, a unique identifier of the customer, and FI computing system 130 may perform operations, described herein, that parse the long URL to identify and extract the embedded data, which FI computing system 130 may store within one or more of the discrete elements of decomposed field data associated with the corresponding one of the RFP messages.

Additionally, or alternatively, in step 408, FI computing system 130 may perform any of the exemplary processes described herein that, based on the detected link (e.g., the long-form URL described above, or a shortened URL, such as a tiny URL), programmatically access the remittance data associated with the processed link, e.g., as maintained at a corresponding one of merchant system 110, 114, or 118. The remittance data may include a PDF or HTML invoice or bill (e.g., formatted invoice data 218 of FIG. 2A), and the FI computing system 130 may perform operations that process the remittance data (e.g., through an application of an optical character recognition (OCR) process to the PDF invoice or bill, parsing code associated with the HTML invoice or bill, applying a screen-scraping technology to the invoice or bill, etc.) to extract the additional or alternate elements of the data that identifies and characterizes user 101, the second counterparty, the initiated purchase transaction, and the requested, real-time payment. For instance, and based on the processed remittance data, the FI computing system may obtain elements of transaction that, among other things, identifies a product or service involved in the initiated purchase transaction (e.g., a UPC, etc.), a transaction time or date, or granular data characterizing the initiated purchase transaction, such as a transaction subtotal and an amount of local sales tax. As described herein, FI computing system 130 may store these additional, obtained elements of transaction within one or more of the discrete elements of decomposed field data associated with the corresponding one of the RFP messages.

In some instances, FI computing system 130 may also perform any of the exemplary processes described herein to process the elements of decomposed field data associated with each of the RFP messages, and obtain information that characterizes the each of the second counterparties (e.g., the retailers) involved in the purchase transactions initiated by the customer during the prior temporal interval, and values of parameters that characterize each of the initiated purchase transactions during the prior temporal interval (e.g., in step 410 of FIG. 4A). The obtained counterparty information, for example, include a counterparty identifier of each of the counterparties (e.g., a counterparty name, a standard industrial classification (SIC) code, etc.) and geographic data characterizing each of the counterparties (e.g., a portion of a corresponding postal address, etc.), and parameter values may include, but are not limited, a transaction date or time, a transaction value, and identifiers of one or more products or services involved in corresponding ones of the first, second, and third purchase transactions.

FI computing system 130 may also perform any of the exemplary processes described herein to identify a customer peer group of additional customer of the financial institution that are demographically similar to the customer (e.g., additional customers that are characterized by a value of one or more demographic parameters that are similar to a corresponding parameter value that characterizes the customer), and to obtain one or more elements of peer interaction data associated with each of the additional customers during a current temporal interval and/or across one or more temporal intervals (e.g., in step 412 of FIG. 4A). As described herein, the elements of peer interaction data associated with a corresponding one of the additional customers may include, among other things, one or more elements of account data 140B, transaction data 140C, and third-party data 140D (e.g., elements of credit-bureau data, etc.) associated with the corresponding one of the additional customers during the current temporal interval and/or across the one or more temporal intervals. Further, by way of example, the demographic parameters may include, among other things, a customer age or a city of residence of customer, and a value of one of the demographic parameters that characterizes one of the additional customers may be similar to a corresponding parameter value that characterizes the customer when the parameter value is equivalent to the corresponding parameter value, when parameter value falls within a predetermined, threshold amount of the corresponding parameter value, or when the parameter value is disposed within a specified value range that includes the corresponding parameter value.

Based on portions of the obtained counterparty information, the obtained transaction parameter values, and the customer-specific elements of peer interaction data associated with one or more of the additional customers, FI computing system 130 may perform any of the exemplary processes described herein to predict an occurrence of one or more additional purchases transactions during a future temporal interval that would be consistent with the spending or transactional behavioral of the customer during the prior temporal interval, and that generate elements of predicted output data that include a value of one or more parameters that characterize each of the predicted occurrences of the additional purchases transactions during the future temporal interval, and in some instances, an aggregate transaction amount across the prior and future temporal intervals (e.g., in step 414 of FIG. 4A). By way of example, the transaction parameter values that characterize each of the predicted occurrences of the additional purchase transactions during the future temporal interval, may include, but are not limited to, a transaction amount, an identifier of a corresponding product or service, a transaction location (e.g., a postal code, etc.), and/or an identifier of a corresponding counterparty, such as an additional retailer.

Further, in some instances, FI computing system 130 may perform operations that generate the elements of predicted output data based on an application of a trained machine learning or artificial intelligence process to elements (e.g., "feature values") of an input dataset obtained, or extracted from, the obtained counterparty information, the obtained transaction parameter values, and/or the customer-specific elements of peer interaction data. As described herein, examples of the trained machine-learning and artificial-intelligence processes may include, but are not limited to, a clustering process, an unsupervised learning process (e.g., a k-means algorithm, a mixture model, a hierarchical clustering algorithm, etc.), a semi-supervised learning process, a supervised learning process, or a statistical process (e.g., a multinomial logistic regression model, etc.). The trained machine-learning and artificial-intelligence processes may also include, among other things, a decision tree process (e.g., a boosted decision tree algorithm, etc.), a random decision forest, an artificial neural network, a deep neural network, or an association-rule process (e.g., an Apriori algorithm, an Eclat algorithm, or an FP-growth algorithm). Further, and as described herein, each of these exemplary machine-learning and artificial-intelligence processes may be trained against, and adaptively improved using, elements of training and validation data, and may be deemed successfully trained and ready for deployment when a value of one or more performance or accuracy metrics are consistent with one or more threshold training or validation criteria.

Referring back to FIG. 4A, FI computing system 130 may perform any of the exemplary processes described herein to obtain information identifying a candidate credit or loan product that is available for provisioning to user 101 and, if provisioned, would be appropriate to fund not only the purchase transactions initiated during the prior temporal interval associated with the queued RFP messages, but also the predicted occurrences of the additional purchase transactions during the future temporal interval (e.g., in step 416 of FIG. 4A). Examples of these candidate credit or loan products include, but are not limited to, an unsecured personal loan or installment loan having a fixed or variable interest rate, a line-of-credit secured against other customer asserts, or other secured or unsecured credit products, and the obtained information may, for the candidate credit or loan product, include one or more internal qualification or underwriting criteria that establish an availability of the candidate credit or loan product to user 101 and enable the financial institution to establish customer- or product-specific terms and conditions.

Further, FI computing system 130 may perform any of the exemplary processes described herein to obtain one or more elements of credit-bureau data associated with the customer, such as, but not limited to, a credit score or a number of credit inquiries during a current or prior temporal interval (e.g., in step 418 of FIG. 4A). FI computing system 130 may also perform any of the exemplary processes described herein to obtain one or more elements of interaction data that characterize interactions between the customer and financial products issued by the financial institution across one or more temporal intervals, and one or more elements of comparative data that identify, characterize, and compare seasonal or year-over-year variations in a spending and transactional habit of the customer (e.g., also in step 418 of FIG. 4A). By way of example, the elements of interaction data may include, among other things, outstanding balances associated with one or more of the financial products (e.g., outstanding balances associated with one or more credit-card accounts or unsecured personal loans, etc.), a current status of one or more of the financial products (e.g., no overdue balances, delinquent, default, etc.), and cashflow metrics associated with one or more of the financial products (e.g., a net cashflow though a deposit account, etc.).

FI computing system 130 may also perform any of the exemplary processes described herein to establish an availability of the candidate credit or loan product the customer and determine customer- or product-specific terms and conditions for the available credit or loan product based on an application of the one or more internal qualification or underwriting criteria to the portions of the elements of predicted output data, the elements of credit-bureau data, the elements of interaction data, and/or the elements of comparative data (e.g., in step 420 of FIG. 4A). By way of example, the available credit or loan product may include an unsecured installment loan, and the established customer- or product-specific terms and conditions for the unsecured installment loan may include, but are not limited to, a loan amount, a fixed interest rate or a variable interest rate, a term, and a monthly payment.

In some instances, FI computing system 130 may perform any of the exemplary processes described herein to generate, for each of the received and queued RFP messages associated with purchase transactions initiated during the prior temporal interval, a payment notification based on corresponding elements of the decomposed field data extracted, obtained, or derived from a corresponding one of the received and queued RFP messages (e.g., in step 422 of FIG. 4A). FI computing system 130 may also perform any of the exemplary processes described herein to generate a product notification associated with the available credit or loan product that is capable of funding the initiated purchase transactions associated with the RFP messages, and the predicted future occurrences of the additional purchase transactions, in accordance with the determined set of "pre-approved" terms and conditions (e.g., in step 424 of FIG. 4A). By way of example, the generated product notification may include an identifier of the available unsecured installment loan, the corresponding loan amount, and the one or more of the determined set of "pre-approved" terms and conditions. Further, in some instances, the product notification may also include one or more elements of digital content that, when rendered for presentation within a digital interface by client device 102, offers the available credit or loan product to the customer and prompts the customer to accept, or alternatively, decline, the offer to fund not only the initiated purchase transactions associated with the RFP messages, but also the predicted future occurrences of the additional purchase transactions that would be consistent with the determine customer intent or purpose of the previously initiated purchase transactions.

FI computing system 130 may perform operations, described herein, to package the product notification and each of the payment notifications into corresponding elements of notification data, and that transmit the elements of notification data across network 120 to a computing device or system associated with the customer, such as client device 102 (e.g., in step 426 of FIG. 4A). Exemplary process 400 may then be complete in step 428.

Referring to FIG. 4B, client device 102 may perform any of the exemplary processes described herein to receive the elements of notification data from FI computing system 130, and store the elements of notification data within a portion of a tangible, non-transitory memory accessible to client device 102 (e.g., in step 432 of FIG. 4B). Client device 102 may also perform any of the exemplary processes described herein to obtain the product notification from the received elements of notification data, and generate, and render for presentation within a corresponding digital interface, a graphical representation of portions of the product notification (e.g., in step 434 of FIG. 4B). As described herein, the presented graphical representation may prompt user 101 to accept, or alternatively, decline, the offer to fund not the purchase transactions initiated during a prior temporal interval (e.g., as associated with the RFP messages), but also the predicted future occurrences of the additional purchase transactions that would be consistent with the determine customer intent or purpose of the previously initiated purchase transactions, using the pre-approved credit or loan product in accordance with the determined terms and conditions.

Further, client device 102 may also receive, via input unit 109B, elements of user input indicative of an acceptance, or alternatively, a decision to decline, the offer to fund the previously initiated purchase transactions and the predicted future occurrences of the additional purchase transactions using the pre-approved credit or loan product (e.g., in step 436 of FIG. 4B), and based on the elements of user input, client device 102 may determine whether the customer accepted, or declined, the offer (e.g., in step 438 of FIG. 4B). If, for example, client device 102 were to determine that user 101 accepted the offer to fund the previously initiated purchase transactions and the predicted future occurrences of the additional purchase transactions using the pre-approved credit or loan product (e.g., step 438; YES), client device 102 may perform any of the exemplary processes described herein to process the elements of input data and generate a product confirmation indicative of the acceptance, by user 101, of the offer to fund the previously initiated purchase transactions and the predicted future occurrences of the additional purchase transactions using the pre-approved credit or loan product, and to transmit a response to the notification data that includes the product confirmation to FI computing system 130 (e.g., in step 440 of FIG. 4B). Exemplary process 430 may be complete in step 442.

Alternatively, if client device 102 were to determine that user 101 declined the offer to fund the previously initiated purchase transactions and the predicted future occurrences of the additional purchase transactions using the pre-approved credit or loan product (e.g., step 438; NO), client device 102 may perform any of the exemplary processes described herein to generate an additional product confirmation indicating the rejection of the offer by user 101 (e.g., in step 444 of FIG. 4B), and to obtain the each of the payment notification from the received elements of notification data, and generate, and render for presentation within a corresponding digital interface, a graphical representation of each of the payment notifications that prompts user 101 to approve, or alternatively, reject, the real-time payment requested from user 101 by corresponding ones of the first retailer, the second retailer, and the third retailer (e.g., in step 446 of FIG. 4B). Client device 102 may receive, via input unit 109B, elements of user input indicative of an approval, or alternatively, a rejection, of each of the requested, real-time payment by user 101 (e.g., in step 448 of FIG. 4B), and based on the elements of user input, client device 102 may determine whether user 101 approved, or rejected, each of the requested real-time payment, and for each of the requested real-time payments, generate a payment confirmation indicative of the approval or the rejection, by user 101, of the corresponding, requested real-time payment (e.g., in step 450 of FIG. 4B). Client device 102 may perform any of the exemplary processes described herein to transmit a response to the notification data that includes the additional product confirmation and each of the payment confirmations to FI computing system 130 (e.g., in step 452 of FIG. 4B). Exemplary process 430 may then be complete in step 444.

Referring to FIG. 4C, FI computing system 130 may receive the elements of response data from client device 102, and may store the received elements of response data within one or more tangible, non-transitory memories accessible to FI computing system 130, such as in conjunction with the elements of decomposed field data within data repository 134 (e.g., in step 462 of FIG. 4C). FI computing system 130 may also perform any of the exemplary processes described herein to obtain, from the elements of response data, the product confirmation indicative of the acceptance, or alternatively, the rejection, the offer to fund the previously initiated purchase transactions and the predicted future occurrences of the additional purchase transactions using the pre-approved credit or loan product (e.g., in step 464 of FIG. 4C), and to process the product confirmation and determine whether user 101 accepted, or declined, the offer for the pre-approved credit or loan product (e.g., in step 466 of FIG. 4C).

If, for example, FI computing system 130 were to determine that user 101 accepted the offer to fund the previously initiated purchase transactions and the predicted future occurrences of the additional purchase transactions using the pre-approved credit or loan product (e.g., step 466; YES), FI computing system 130 may perform any of the exemplary processes described herein to complete a qualification or underwriting process and issue the pre-approved credit or loan product to the customer (e.g., in step 468 of FIG. 4C). FI computing system 130 may perform any of the exemplary processes described herein, in step 468, to execute the each of the real-time payment requested by respective ones of the merchants (e.g., respective ones of the first retailer, the second retailer, and the third retailer) based on the elements of decomposed field data associated with corresponding ones of the RFP messages (e.g., as maintained within RTP data store 144). By way of example, and for each of the requested real-time payments, FI computing system 130 may access the corresponding elements of decomposed field data, obtain a payment amount, an identifier of a customer and an identifier of an account of the corresponding merchant, and perform any of the exemplary processes described herein to debit the payment amount from an account associated with the issued credit or loan product, and credit the payment amount to the merchant account (e.g., either directly, if the financial institution issues the account associated with the first retailer, the second retailer, or the third retailer, or based on additional ISO-20022-compliant RTP messages exchanged with computing systems associated with other financial institutions). FI computing system 130 may also perform operations that access and delete corresponding ones of the RFP messages maintained within RFP queue 135.

Further, FI computing system 130 may also perform operations in step 468 that transmit one or more messages to a merchant computing system associated with each of the real-time payments funded using the issued credit or loan product (e.g., merchant systems 110, 114, and 118) that confirms the real-time clearance and settlement of the a corresponding one of the requested, real-time payments, either directly across network 120 or through one or more of computing systems or devices associated with participants in the RTP ecosystem (e.g., additional ISO-20022-compliant messages, etc.). Based on the one or more messages, the merchant computing systems perform operations that enable the merchants to execute corresponding ones of the initiated purchase transaction and provision the purchased products or services, to user 101. Exemplary process 460 may then be complete in step 470.

Alternatively, if FI computing system 130 were to determine that user 101 decline the offer to fund the requested, real-time payment using the pre-approved credit or loan product (e.g., step 466; NO), FI computing system 130 may perform any of the exemplary processes described herein to obtain, from the elements of response data, one of the payment confirmations indicative of the approval, or alternatively, the rejection, of a corresponding one of the real-time payment requests (e.g., in step 472 of FIG. 4C), and determine whether user 101 approved, or rejected, the corresponding one of the requested, real-time payments (e.g., in step 474 of FIG. 4C).

If, for example, FI computing system 130 were to determine that user 101 approved the requested, real-time payment associated with the selected payment confirmation (e.g., step 474; YES), FI computing system 130 may perform any of the exemplary processes described herein to execute the now-approved real-time payment based on the payment confirmation and in accordance with the corresponding elements of decomposed field data, and that delete the RFP message from the RFP message queue (e.g., in step 476 of FIG. 4C).

FI computing system 130 may parse the elements of response data and determine whether additional payment confirmations await processing (e.g., in step 478 of FIG. 4C). If FI computing system 130 were to determine that additional payment confirmations await processing (e.g., step 478; YES), exemplary process 460 may pass back to step 474, and FI computing system 130 may select an additional payment confirmation for processing. Alternatively, if FI computing system 130 were to determine that no additional payment confirmations await processing (e.g., step 478; NO), exemplary process 460 may then be complete in step 470.

Referring back to step 474, if FI computing system 130 were to determine that user 101 rejected the requested, real-time payment (e.g., step 474; NO), FI computing system 130 may perform any of the exemplary processes described herein to broadcast one or more additional ISO-20022-compliant RTP messages that confirm the rejection of the requested, real-time payment by user 101, and that delete the RFP message from the RFP queue (e.g., in step 480 of FIG. 4C). Exemplary process 460 may be complete in step 470.

In other examples, and based on a temporal pendency within RFP queue 135 of a particular one of the RFP massages associated with the requested, real-time payment subject to funding by the issued credit or loan product (e.g., the temporal pendency exceeds a predetermined, threshold pendency), FI computing system 130 may perform any of the exemplary processes described herein to generate and provision a corresponding payment notification to client device 102, e.g., for presentation within a corresponding digital interface, such as notification interface 352 of FIGS. 3A and 3B, prior to a performance of the exemplary processes described herein that determine the customer intent or purpose of the initiated purchase transactions associated with the queued RFP massages that predict occurrences of additional purchase transactions during a future temporal interval that would be consistent with the determined customer intent or purpose, and that pre-approve user 101 for a candidate credit or loan product capable of funding the initiated purchase transactions and the predicted future occurrences of the additional purchase transactions during the future temporal interval.

By way of example, the presented payment notification may prompt user 101 to fund the $50.00 real-time payment requested by the first retailer (e.g., "Sam's Haberdashery") on May 30, 2022, for the shirt purchased at 10:30 a.m. on May 30th (e.g., in step 444 of FIG. 4B). Based on the present payment notification, user 101 may provide input to client device 102, via input unit 109B, elements of user input indicative of an approval of the requested, $50.00 real-time payment (e.g., in step 446 of FIG. 4B), and client device 102 may generate, and transmit across network 120 to FI computing system 130, a payment confirmation indicative of the approval, by user 101, of the corresponding, requested real-time payment (e.g., in steps 448 and 450 of FIG. 4B). Upon receipt of the payment confirmation, FI computing system 130 may perform any of the exemplary processes described herein to execute the now-approved real-time payment of $50.00 to the first retailer (e.g., "Sam's Haberdashery") based on the payment confirmation and in accordance with the corresponding elements of decomposed field data, e.g., by debiting $50.00 from the deposit account of user 101 specified within payment data 208 of decomposed field data 204, and by crediting the $50.00 to the account of the first retailer specified within payment data 208 of decomposed field data 204 using any of the exemplary processes described herein.

In some instances, user 101 may elect to the provisioned offer to fund the previously initiated purchase transactions, which include the $50.00 real-time payment requested by the first retailer on May 30, 2022, and the predicted future occurrences of the additional purchase transactions using the pre-approved credit or loan product, subsequent to the approval of the requested, $50.00 real-time payment. Based on the prior approval of the requested, $50.00 real-time payment, FI computing system 130 may perform operations, in step 468 of FIG. 4C, to reverse the execution of the requested, $50.00 real-time payment using the funds maintained within the deposit account of user 101 by crediting the $50.00 to the deposit account user 101 and debiting the previously credited $50.00 from the account of the first retailer, and by performing any of the exemplary processes described herein to debit the $50.00 payment amount from the account associated with the issued credit or loan product.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure, including decomposition engine 146, analytical engine 148, notification engine 150, application programming interfaces (APIs) 203 and 344, remittance analysis engine 240, predictive module 302, pre-approval module 308, extraction module 346, and interface element generation module 348, can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array)

or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of nonvolatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, such as user 101, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. An apparatus comprising:
a communications interface;
a memory storing instructions; and
at least one processor coupled to the communications interface and to the memory, the at least one processor being configured to execute the instructions to:
receive a plurality of messages via the communications interface, each of the messages being associated with a real-time payment requested from a first counterparty by a corresponding second counterparty, and each of the messages comprising elements of message data that are disposed within corresponding message fields, and that characterize a first exchange of data initiated between the first counterparty and the corresponding second counterparty during a first temporal interval;
obtain mapping data associated with the message fields, and for at least a subset of the messages, perform operations that obtain the elements of message data from corresponding ones of the message fields based on the mapping data;
apply a trained machine-learning or artificial-intelligence process to an input dataset comprising one or more of the elements of message data;
based on the application of the trained machine-learning or artificial-intelligence process to the input dataset, generate output data characterizing a predicted occurrence of a second exchange of data that involves the first counterparty during a second temporal interval, the second temporal interval being disposed subsequent to the first temporal interval, and the output data comprising a value of at least one parameter that characterizes the predicted occurrence of the second data exchange during the second temporal interval; and
based on the at least one parameter value, generate product data characterizing a product that is available to the first counterparty and associated with the predicted occurrence of the second data exchange, and transmit, via the communications interface, notification data that includes the product data to a device operable by the first counterparty, the notification data causing an application program executed at the device to present a portion of the product data within a digital interface.

2. The apparatus of claim 1, wherein the at least one processor is further configured to execute the instructions to:
for each of the messages, perform operations that obtain the elements of message data from corresponding ones of the message fields based on the mapping data; and
store the elements of message data associated with each of the messages within the memory, the elements of message data comprising, for a corresponding one of the messages, a first identifier of the first counterparty, a second identifier of the corresponding second counterparty, and a parameter value characterizing the corresponding first data exchange.

3. The apparatus of claim 1, wherein:
each of the messages comprises a request-for-payment message, the message fields of each of the request-for-payment messages being structured in accordance with a standardized data-exchange protocol; and
the mapping data comprises elements that identify corresponding ones of the elements of the message data and corresponding ones of the message fields.

4. The apparatus of claim 1, wherein the at least one processor is further configured to execute the instructions to obtain, based on the mapping data, information associated with the first data exchange from one or more of the message fields of a corresponding one of the messages, the information comprising a uniform resource locator associated with elements of formatted data maintained by a computing system.

5. The apparatus of claim 4, wherein the at least one processor is further configured to execute the instructions to:
based on the uniform resource locator, perform operations that request and receive one or more of the elements of formatted data from the computing system via the communications interface; and
process the one or more elements of formatted data, and obtain at least one of (i) an additional parameter value characterizing the first data exchange associated with the corresponding message from the processed elements of formatted data or (ii) one or more elements of contextual data that characterize the first data exchange associated with the corresponding message based on the processed elements of formatted data.

6. The apparatus of claim 1, wherein the at least one processor is further configured to execute the instructions to:
determine an aggregated value of the parameter characterizing the first exchanges of data during the first temporal interval; and
determine that the product is available to the first counterparty based on the first and second aggregated parameter values.

7. The apparatus of claim 1, wherein the at least one processor is further configured to:
based on one or more of the elements of message data, determine a value of at least one parameter that characterizes the first counterparty, and obtain identifiers of a plurality of peer counterparties characterized by the at least one parameter value;
based on the identifiers, obtain elements of behavioral data associated with the plurality of peer counterparties, the behavioral data characterizing a behavior of one or more of the peer counterparties during the first temporal interval; and
based on the elements of message data and the elements of behavioral data, perform operations that predict an occurrence of a second exchange of data that involves the first counterparty during the second temporal interval.

8. The apparatus of claim 1, wherein:
the product data comprises a product identifier and information specifying a term or condition of the product;
the notification data comprises an element of digital content associated with the product; and
the notification data causes the executed application program to present at least the portion of the product data and the element of digital content within the digital interface.

9. The apparatus of claim 1, wherein the at least one processor is further configured to transmit the notification data to the device via the communications interface prior to an execution of at least one of the first exchanges of data initiated between the first counterparty and the corresponding second counterparty.

10. A computer-implemented method, comprising:
receiving a plurality of messages using at least one processor, each of the messages being associated with a real-time payment requested from a first counterparty by a corresponding second counterparty, and each of the messages comprising elements of message data that are disposed within corresponding message fields, and that characterize a first exchange of data initiated between the first counterparty and the corresponding second counterparty during a first temporal interval;
using the at least one processor, obtaining mapping data associated with the message fields, and for at least a subset of the messages, performing operations that obtain the elements of message data from corresponding ones of the message fields based on the mapping data;
applying, using the at least one processor, a trained machine-learning or artificial-intelligence process to an input dataset comprising one or more of the elements of message data;
based on the application of the trained machine-learning or artificial-intelligence process to the input dataset, generating, using the at least one processor, output data characterizing a predicted occurrence of a second exchange of data that involves the first counterparty during a second temporal interval, the second temporal interval being disposed subsequent to the first temporal interval, and the output data comprising a value of at least one parameter that characterizes the predicted occurrence of the second data exchange during the second temporal interval; and
based on the at least one parameter value, generating, using the at least one processor, product data characterizing a product that is available to the first counterparty and associated with the predicted occurrence of the second data exchange, and transmitting, using the at least one processor, notification data that includes the product data to a device operable by the first counterparty, the notification data causing an application program executed at the device to present a portion of the product data within a digital interface.

11. The computer-implemented method of claim 10, further comprising:
for each of the messages, performing the operations, using the at least one processor, that obtain the elements of message data from corresponding ones of the message fields based on the mapping data; and
storing, using the at least one processor, the elements of message data associated with each of the messages within a data repository, the elements of message data comprising, for a corresponding one of the messages, a first identifier of the first counterparty, a second identifier of the corresponding second counterparty, and a parameter value characterizing the corresponding first data exchange.

12. The computer-implemented method of claim 10, wherein:
each of the messages comprises a request-for-payment message, the message fields of each of the request-for-payment messages being structured in accordance with a standardized data-exchange protocol; and
the mapping data comprises elements that identify corresponding ones of the elements of the message data and corresponding ones of the message fields.

13. The computer-implemented method of claim 10, further comprising:
based on the mapping data, obtaining, using the at least one processor, information associated with the first data exchange from one or more of the message fields of a corresponding one of the messages, the information comprising a uniform resource locator associated with elements of formatted data maintained by a computing system;
based on the uniform resource locator, performing operations, using the at least one processor, that request and receive one or more of the elements of formatted data from the computing system; and
using the at least one processor, processing the one or more elements of formatted data, and obtaining at least one of (i) an additional parameter value characterizing the first data exchange associated with the corresponding message from the processed elements of formatted data or (ii) one or more elements of contextual data that characterize the first data exchange associated with the corresponding message based on the processed elements of formatted data.

14. The computer-implemented method of claim 10, further comprising:

determining, using the at least one processor, an aggregated value of the parameter characterizing the first exchanges of data during the first temporal interval; and determining, using the at least one processor, that the product is available to the first counterparty based on the first and second aggregated parameter values.

15. The computer-implemented method of claim 10, wherein:

the computer-implemented method further comprises:
- based on one or more of the elements of message data, and using the at least one processor, determining a value of at least one parameter that characterizes the first counterparty, and obtaining identifiers of a plurality of peer counterparties characterized by the at least one parameter value; and
- based on the identifiers, obtaining, using the at least one processor, elements of behavioral data associated with the plurality of peer counterparties, the behavioral data characterizing a behavior of one or more of the peer counterparties during the first temporal interval; and the performing comprises performing operations that predict an occurrence of the second exchange of data during the second temporal interval based on the elements of message data and the elements of behavioral data.

16. A tangible, non-transitory computer-readable medium storing instructions that, when executed by at least one processor, cause the at least one processor to perform a method, comprising:

receiving a plurality of messages, each of the messages being associated with a real-time payment requested from a first counterparty by a corresponding second counterparty, and each of the messages comprising elements of message data that are disposed within corresponding message fields, and that characterize a first exchange of data initiated between the first counterparty and the corresponding second counterparty during a first temporal interval;

obtaining mapping data associated with the message fields, and for at least a subset of the messages, performing operations that obtain the elements of message data from corresponding ones of the message fields based on the mapping data;

applying a trained machine-learning or artificial-intelligence process to an input dataset comprising one or more of the elements of message data;

based on the application of the trained machine-learning or artificial-intelligence process to the input dataset, generating output data characterizing a predicted occurrence of a second exchange of data that involves the first counterparty during a second temporal interval, the second temporal interval being disposed subsequent to the first temporal interval, and the output data comprising a value of at least one parameter that characterizes the predicted occurrence of the second data exchange during the second temporal interval; and based on the at least one parameter value, generating product data characterizing a product that is available to the first counterparty and associated with the predicted occurrence of the second data exchange, and transmitting, using the at least one processor, notification data that includes the product data to a device operable by the first counterparty, the notification data causing an application program executed at the device to present a portion of the product data within a digital interface.

* * * * *